US011337234B2

(12) United States Patent
Shabbo et al.

(10) Patent No.: US 11,337,234 B2
(45) Date of Patent: May 17, 2022

(54) FACILITATING FREQUENCY SELECTIVE SCHEDULING IN ADVANCED NETWORKS

(71) Applicants: AT&T Intellectual Property I, L.P., Atlanta, GA (US); AT&T Mobility II LLC, Atlanta, GA (US)

(72) Inventors: Safaa Shabbo, Atlanta, GA (US); Sairamesh Nammi, Austin, TX (US); Vladimir Gusavac, Dunwoody, GA (US)

(73) Assignees: AT&T Intellectual Property I, L.P., Atlanta, GA (US); AT&T Mobility II LLC, Atlanta, GA (US)

( * ) Notice: Subject to any disclaimer, the term of this patent is extended or adjusted under 35 U.S.C. 154(b) by 248 days.

(21) Appl. No.: 16/436,849

(22) Filed: Jun. 10, 2019

(65) Prior Publication Data

US 2020/0389908 A1 Dec. 10, 2020

(51) Int. Cl.
| | |
|---|---|
| *H04W 72/12* | (2009.01) |
| *H04W 72/04* | (2009.01) |
| *H04L 5/00* | (2006.01) |
| *H04B 7/06* | (2006.01) |
| *H04L 25/02* | (2006.01) |

(52) U.S. Cl.
CPC ...... *H04W 72/1252* (2013.01); *H04B 7/0626* (2013.01); *H04B 7/0639* (2013.01); *H04L 5/0051* (2013.01); *H04L 5/0098* (2013.01); *H04L 25/0226* (2013.01); *H04W 72/0453* (2013.01)

(58) Field of Classification Search
None
See application file for complete search history.

(56) References Cited

U.S. PATENT DOCUMENTS

| | | | |
|---|---|---|---|
| 8,284,726 B2 | 10/2012 | Shu et al. | |
| 9,119,216 B2 | 8/2015 | Berberana Fernandez-Murias et al. | |
| 9,137,001 B2 | 9/2015 | Shah et al. | |

(Continued)

FOREIGN PATENT DOCUMENTS

KR 101524622 B1 6/2015

OTHER PUBLICATIONS

C-RNTI Management for Orthogonally-Filled Subframes in LTE Heterogeneous Networks; Stepan Kucera, David L'opez-P'erez, IEEE (Year: 2015).*

*Primary Examiner* — Kenny S Lin
*Assistant Examiner* — Richard Schnell
(74) *Attorney, Agent, or Firm* — Amin, Turocy & Watson, LLP

(57) ABSTRACT

Facilitating frequency selective scheduling in advanced networks (e.g., 4G, 5G, and beyond) with multiple transmission points is provided herein. Operations of a system can comprise facilitating an activation of a frequency selective scheduling based on identification of control channel elements used for a downlink control channel. The operations also can comprise instructing a user equipment device to report a subband channel quality indicator and a subband precoding matrix index based on a result of an evaluation of a metric determined based on channel conditions. Further, the operations can comprise scheduling the user equipment device with a subband based on the subband channel quality indicator and the subband precoding matrix index reported by the user equipment device.

20 Claims, 14 Drawing Sheets

(56) References Cited

U.S. PATENT DOCUMENTS

| | | | |
|---|---|---|---|
| 9,137,795 B2 | 9/2015 | Bi et al. | |
| 9,794,818 B2 | 10/2017 | Zhou et al. | |
| 2009/0154588 A1* | 6/2009 | Chen | H04L 5/0023 375/267 |
| 2012/0026986 A1 | 2/2012 | Dass | |
| 2012/0327876 A1* | 12/2012 | Ouchi | H04J 11/00 370/329 |
| 2013/0194931 A1* | 8/2013 | Lee | H04W 72/04 370/241 |
| 2014/0086161 A1* | 3/2014 | Cai | H04W 56/0045 370/329 |
| 2014/0293924 A1 | 10/2014 | Wang et al. | |
| 2015/0065152 A1* | 3/2015 | Sadek | H04L 5/0089 455/450 |
| 2015/0082133 A1* | 3/2015 | Cao | H04L 1/0061 714/807 |
| 2015/0236839 A1* | 8/2015 | Shah | H04W 72/042 370/329 |
| 2015/0350955 A1* | 12/2015 | Somasundaram | H04W 72/1252 370/329 |
| 2016/0278098 A1 | 9/2016 | Vos et al. | |
| 2017/0303243 A1* | 10/2017 | Xu | H04W 72/0453 |
| 2017/0332359 A1* | 11/2017 | Tsai | H04W 72/0446 |
| 2020/0022009 A1* | 1/2020 | Hessler | H04B 7/0658 |

\* cited by examiner

FACILITATING FREQUENCY SELECTIVE SCHEDULING IN ADVANCED NETWORKS

TECHNICAL FIELD

This disclosure relates generally to the field of mobile communication and, more specifically, to facilitating frequency selective scheduling in advanced networks (e.g., 4G, 5G, and beyond).

BACKGROUND

To meet the huge demand for data centric applications, Third Generation Partnership Project (3GPP) systems and systems that employ one or more aspects of the specifications of the Fourth Generation (4G) standard for wireless communications will be extended to a Fifth Generation (5G) standard for wireless communications. Unique challenges exist to provide levels of service associated with forthcoming 5G, or other next generation, standards for wireless communication.

BRIEF DESCRIPTION OF THE DRAWINGS

Various non-limiting embodiments are further described with reference to the accompanying drawings in which.

DETAILED DESCRIPTION

Figure 1:
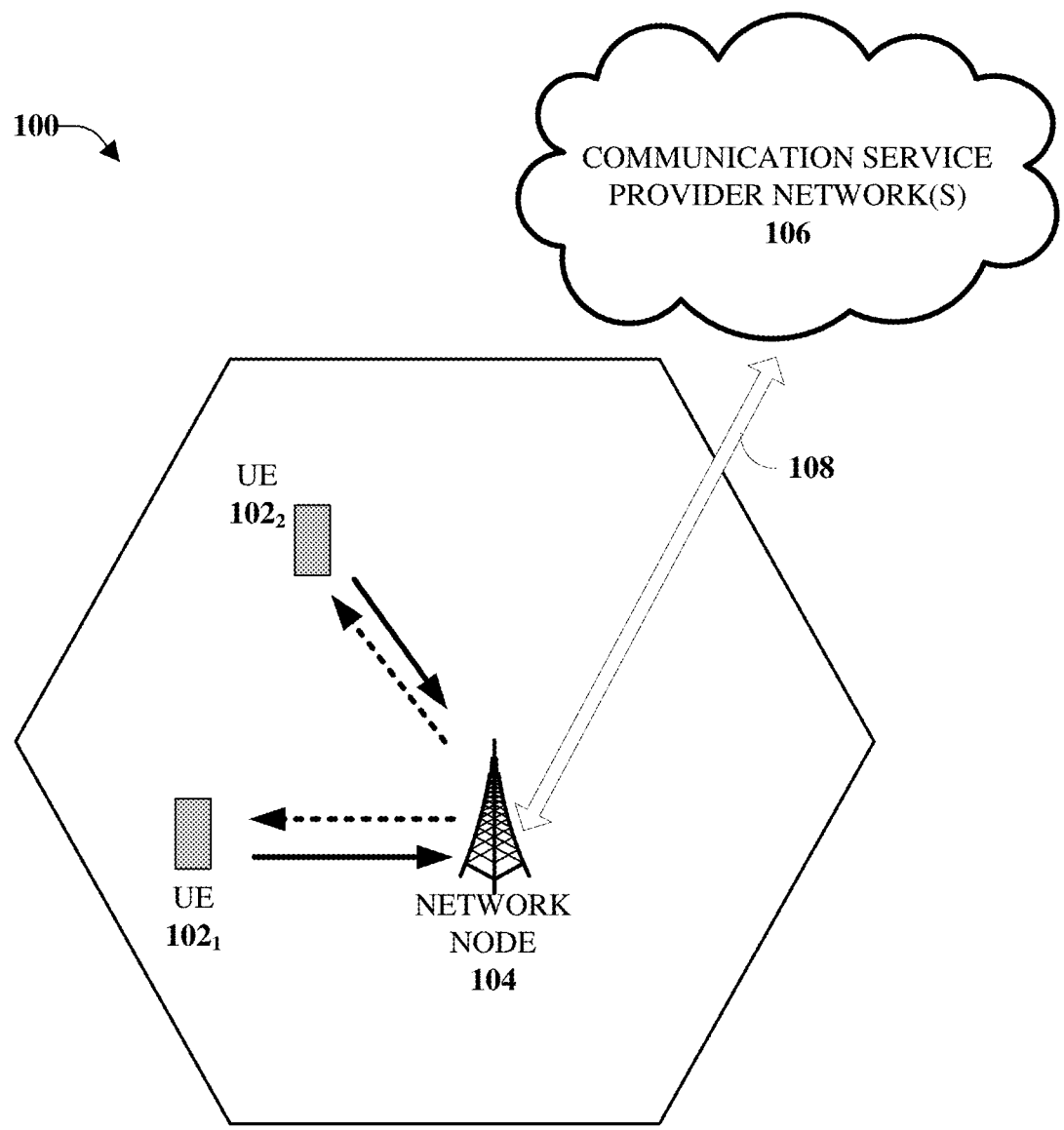
FIG. 1 illustrates an example, non-limiting, wireless communication system in accordance with one or more embodiments described herein.

One or more embodiments are now described more fully hereinafter with reference to the accompanying drawings in which example embodiments are shown. In the following description, for purposes of explanation, numerous specific details are set forth in order to provide a thorough understanding of the various embodiments. However, the various embodiments can be practiced without these specific details (and without applying to any particular networked environment or standard).

Described herein are systems, methods, articles of manufacture, and other embodiments or implementations that can facilitate frequency selective scheduling in advanced networks. More specifically described herein are aspects related to reporting subband channel quality information to perform frequency selective scheduling in wireless communication system in advanced networks. According to some implementations, the wireless communication system can be an Orthogonal Frequency-Division Multiplexing (OFDM) wireless communication system.

To meet the huge demand for data centric applications, 4G standards can be applied to 5G, also called New Radio (NR) access. The 5G networks can comprise the following: data rates of several tens of megabits per second supported for tens of thousands of users; 1 gigabit per second can be offered simultaneously (or concurrently) to tens of workers on the same office floor; several hundreds of thousands of simultaneous (or concurrent) connections can be supported for massive sensor deployments; spectral efficiency can be enhanced compared to 4G; improved coverage; enhanced signaling efficiency; and reduced latency compared to Long Term Evolution (LTE).

Multiple Input, Multiple Output (MIMO) systems can significantly increase the data carrying capacity of wireless systems. For these reasons, MIMO is an integral part of the third and fourth generation wireless systems (e.g., 3G and 4G). In addition, 5G systems also employ MIMO systems, which are referred to as massive MIMO systems (e.g., hundreds of antennas at the transmitter side (e.g., network) and/receiver side (e.g., user equipment). With a $(N_t, N_r)$ system, where $N_t$ denotes the number of transmit antennas and Nr denotes the receive antennas, the peak data rate multiplies with a factor of $N_t$ over single antenna systems in rich scattering environment.

According to an embodiment, provided is a system that can comprise a processor and a memory that stores executable instructions that, when executed by the processor, facilitate performance of operations. The operations can comprise facilitating an activation of a frequency selective scheduling based on identification of control channel elements used for a downlink control channel. The operations also can comprise instructing a user equipment device to report a subband channel quality indicator and a subband precoding matrix index based on an evaluation of a metric determined based on channel conditions. Further, the operations can comprise scheduling the user equipment device with a subband based on the subband channel quality indicator and the subband precoding matrix index reported by the user equipment device. In an example, scheduling the user equipment device can comprise scheduling the user equipment device via a downlink channel configured to operate according to a fifth generation (or another advanced) wireless network communication protocol.

According to some implementations, facilitating the activation of the frequency selective scheduling can comprise determining a number of connected user equipment devices, including the user equipment device, is below a defined level of user equipment devices. Further to these implementations, the operations can comprise facilitating a deactivation of the frequency selective scheduling based on a second determination that the number of connected user equipment devices is at or above the defined level of user equipment devices.

In other implementations, facilitating the activation of the frequency selective scheduling can comprise monitoring a number of control channel elements in use and facilitating the activation of the frequency selective scheduling based on the number of control channel elements in use being below a defined channel element utilization level. Further to these implementations, the operations can comprise facilitating a deactivation of the frequency selective scheduling based on a second determination that the number of control channel elements is at or above the defined channel element utilization level.

According to another implementation, the operations can comprise obtaining information indicative of a quantity of cell radio network temporary identities within a communications network. Further, the operations can comprise facilitating the activation of the frequency selective scheduling based on the quantity of cell radio network temporary identities within the communications network failing to satisfy a defined quantity. In addition, according to these implementations, the operations can comprise facilitating a deactivation of frequency selective scheduling based on a second determination that the quantity of cell radio network temporary identities within the communications network satisfies the defined quantity.

In accordance with some implementations, instructing the user equipment device to provide the subband channel quality indicator and the subband precoding matrix index can comprise determining a first signal to noise value of a first subband for a first channel and a second signal to noise value of a second subband of a second channel. In addition, the operations can comprise facilitating the activation of the frequency selective scheduling based on the first signal to noise value and the second signal to noise value being different by more than a defined amount.

According to some implementations, instructing the user equipment device to provide the subband channel quality indicator and the subband precoding matrix index can comprise determining a delay spread between the user equipment device and a network node device of a wireless network. Further to these implementations, determining the delay spread can comprise estimating an uplink channel from a sounding reference signal and determining a number of paths available.

Alternatively, determining the delay spread can comprise evaluating a variation of respective reported channel quality indicators of subbands of a group of subbands. Further, determining the delay spread can comprise facilitating a deactivation of the frequency selective scheduling based on a second determination that the variation of the respective reported channel quality indicators does not satisfy a defined variation.

Another embodiment can relate to a method that can comprise identifying, by a network device of a group of network devices of a wireless network, a traffic load of the wireless network, the network device comprising a processor. The method also can comprise facilitating, by the network device, an activation of a frequency selective scheduling for a mobile device based on the traffic load of the wireless network satisfying a defined capacity value.

According to some implementations, the method can comprise determining, by the network device, a performance metric of the mobile device. The method also can comprise instructing, by the network device, the mobile device to provide channel state information reporting configurations based on the performance metric of the mobile device satisfying a defined performance metric.

Further to these implementations, the method can comprise estimating, by the network device, an uplink channel from a sounding reference signal and determining, by the network device, a number of paths available. Further, the method can comprise determining, by the network device, a delay spread between the mobile device and the network device of the wireless network based on the number of paths available.

In accordance with some implementations, the method can comprise after a defined interval, evaluating, by the network device, the traffic load of the wireless network. Further, the method can comprise facilitating, by the network device, a deactivation of the frequency selective scheduling for the mobile device based on a determination that the traffic load of the wireless network no longer satisfies the defined capacity value.

The method can comprise, according to some implementations, evaluating, by the network device, a variation of reported channel quality indicators of subbands of a group of subbands. The method also can comprise facilitating, by the network device, a deactivation of the frequency selective scheduling based on a determination that a variation of the reported channel quality indicators does not satisfy a defined variation.

Another embodiment can relate to a machine-readable storage medium, comprising executable instructions that, when executed by a processor, facilitate performance of operations. The operations can comprise receiving, from a network node device, an instruction to report a subband channel quality indicator and a subband precoding matrix index. Receiving the instruction can be based on a frequency selective scheduling. The operations also can comprise determining the subband channel quality indicator and the subband precoding matrix index and transmitting, to the network node device, information indicative of the subband channel quality indicator and the subband precoding matrix index.

According to some implementations, transmitting the report can comprise transmitting the report via a physical uplink shared channel configured to operate according to a fifth generation wireless network communication protocol. Alternatively, according to some implementations, transmitting the report can comprise transmitting the report via a physical uplink control channel configured to operate according to a fifth generation wireless network communication protocol.

Referring now to FIG. 1, illustrated is an example, non-limiting, wireless communication system 100 in accordance with one or more embodiments described herein. According to various embodiments, the wireless communication system 100 can comprise one or more User Equipment devices (UEs), illustrated as a first UE $102_1$ and a second UE $102_2$. It is noted that although only two UEs are illustrated for purposes of simplicity, the wireless communication system 100 can comprise a multitude of UEs.

The non-limiting term user equipment can refer to any type of device that can communicate with a network node in a cellular or mobile communication system. A UE can comprise one or more antenna panels having vertical and horizontal elements. UEs can be any user equipment device, such as a mobile phone, a smartphone, a cellular enabled laptop (e.g., comprising a broadband adapter), a tablet computer, a wearable device, a virtual reality (VR) device, a heads-up display (HUD) device, a smart car, a machine-type communication (MTC) device, and the like. Other examples of UEs comprise, but are not limited to, a target device, device to device (D2D), machine type UE or UE capable of machine to machine (M2M) communications, personal digital assistant (PDA), tablet, mobile terminals, laptop mounted equipment (LME), universal serial bus (USB) dongles enabled for mobile communications, a computer having mobile capabilities, a mobile device such as cellular phone, a laptop having laptop embedded equipment (LEE), such as a mobile broadband adapter, a tablet computer having a mobile broadband adapter, and the like. User equipment (e.g., the first UE $102_1$, the second UE $102_2$) can also comprise Internet of Things (IOT) devices that can communicate wirelessly. UEs can roughly correspond to the mobile station (MS) in Global System for Mobile communications (GSM) systems.

In various embodiments, the wireless communication system 100 is, or can comprise, a wireless communication network serviced by one or more wireless communication network providers. In example embodiments, a UE (e.g., the first UE $102_1$, the second UE $102_2$) can be communicatively coupled to the wireless communication network via a network node device 104. The network node (e.g., network node device) can communicate with the UEs, thus providing connectivity between the UEs and the wider cellular network. Further, the network node device 104 can facilitate wireless communication between the UEs and the wireless communication network (e.g., one or more communication service provider networks 106) via the network node device 104. In example embodiments, the UEs (e.g., the first UE $102_1$, the second UE $102_2$) can send and/or receive communication data via a wireless link to the network node device 104. The dashed arrow lines from the network node device 104 to the UEs (e.g., the first UE $102_1$, the second UE $102_2$) represent downlink (DL) communications and the solid arrow lines from the UE (e.g., the first UE $102_1$, the second UE $102_2$) to the network nodes (e.g., the network node device 104) represents uplink (UL) communications.

The wireless communication system 100 can further comprise one or more communication service provider networks 106 that can facilitate providing wireless communication services to various UEs, (e.g., the first UE $102_1$, the second UE $102_2$), via the network node device 104 and/or various additional network devices (not shown) included in the one or more communication service provider networks 106. The one or more communication service provider networks 106 can include various types of disparate networks, including but not limited to: cellular networks, femto networks, picocell networks, microcell networks, internet protocol (IP) networks, Wi-Fi service networks, broadband service networks, enterprise networks, cloud based networks, and the like.

The non-limiting term network node (e.g., network node device) can be used herein to refer to any type of network node serving one or more UEs and/or connected to other network nodes, network elements, other nodes, and/or other devices from which one or more UEs can receive a radio signal. In cellular radio access networks (e.g., Universal Mobile Telecommunications System (UMTS) networks), a network node can be referred to as Base Transceiver Stations (BTS), radio base station, radio network nodes, base stations, Node B, eNode B (e.g., evolved Node B), and so on. In 5G terminology, the node can be referred to as a gNode B (e.g., gNB) device.

Network nodes can also comprise multiple antennas for performing various transmission operations (e.g., Multiple Input, Multiple Output (MIMO) operations). A network node can comprise a cabinet and other protected enclosures, an antenna mast, and actual antennas. Network nodes can serve several cells, also called sectors, depending on the configuration and type of antenna. Examples of network nodes (e.g., network node device 104) can comprise but are not limited to: Node B devices, Base Station (BS) devices, Access Point (AP) devices, and Radio Access Network (RAN) devices. The network node device 104 can also comprise Multi-Standard Radio (MSR) radio node devices, comprising: an MSR BS, an eNode B, a network controller, a Radio Network Controller (RNC), a Base Station Controller (BSC), a relay, a donor node controlling relay, a Base Transceiver Station (BTS), a transmission point, a transmission node, a Remote Radio Unit (RRU), a Remote Radio Head (RRH), nodes in distributed antenna system (DAS), and the like.

For example, in at least one implementation, the wireless communication system 100 can be, or can include, a large scale wireless communication network that spans various geographic areas. According to this implementation, the one or more communication service provider networks 106 can be, or can include, the wireless communication network and/or various additional devices and components of the wireless communication network (e.g., additional network devices and cell, additional UEs, network server devices, etc.).

The network node device 104 can be connected to the one or more communication service provider networks 106 via one or more backhaul links 108. For example, the one or more backhaul links 108 can comprise wired link components, such as a T1/E1 phone line, a digital subscriber line (DSL) (e.g., either synchronous or asynchronous), an asymmetric DSL (ADSL), an optical fiber backbone, a coaxial cable, and the like. The one or more backhaul links 108 can also comprise wireless link components, such as but not limited to, line-of-sight (LOS) or non-LOS links which can include terrestrial air-interfaces or deep space links (e.g., satellite communication links for navigation).

The wireless communication system 100 can employ various cellular systems, technologies, and modulation modes to facilitate wireless radio communications between devices (e.g., the UEs (e.g., the first UE $102_1$, the second UE $102_2$) and the network node device 104). While example embodiments might be described for 5G new radio (NR) systems, the embodiments can be applicable to any radio access technology (RAT) or multi-RAT system where the UE operates using multiple carriers e.g. LTE FDD/TDD, GSM/GERAN, CDMA2000, and so on.

For example, the wireless communication system 100 can operate in accordance with Global System for Mobile Communications (GSM), Universal Mobile Telecommunications Service (UMTS), Long Term Evolution (LTE), LTE frequency division duplexing (LTE FDD), LTE Time Division Duplexing (TDD), High Speed Packet Access (HSPA), Code Division Multiple Access (CDMA), Wideband CDMA (WCMDA), CDMA2000, Time Division Multiple Access (TDMA), Frequency Division Multiple Access (FDMA), Multi-Carrier Code Division Multiple Access (MC-CDMA), Single-Carrier Code Division Multiple Access (SC-CDMA), Single-Carrier FDMA (SC-FDMA), Orthogonal Frequency Division Multiplexing (OFDM), Discrete Fourier Transform Spread OFDM (DFT-spread OFDM) Single Carrier FDMA (SC-FDMA), Filter Bank Based Multi-Carrier (FBMC), Zero Tail DFT-spread-OFDM (ZT DFT-s-OFDM), Generalized Frequency Division Multiplexing (GFDM), Fixed Mobile Convergence (FMC), Universal Fixed Mobile Convergence (UFMC), Unique Word OFDM (UW-OFDM), Unique Word DFT-spread OFDM (UW DFT-Spread-OFDM), Cyclic Prefix OFDM CP-OFDM, resource-block-filtered OFDM, Wi Fi, WLAN, WiMax, and the like.

However, various features and functionalities of the wireless communication system 100 are particularly described wherein the devices (e.g., the UEs (e.g., the first UE $102_1$, the second UE $102_2$) and the network node device 104) of the wireless communication system 100 are configured to communicate wireless signals using one or more multi carrier modulation schemes, wherein data symbols can be transmitted simultaneously over multiple frequency subcarriers (e.g., OFDM, CP-OFDM, DFT-spread OFMD, UFMC, FMBC, etc.). The embodiments are applicable to single carrier as well as to MultiCarrier (MC) or Carrier Aggregation (CA) operation of the UE. The term carrier aggregation is also called (e.g. interchangeably called) "multi-carrier system," "multi-cell operation," "multi-carrier operation," "multi-carrier" transmission and/or reception. Note that some embodiments are also applicable for Multi RAB (radio bearers) on some carriers (that is data plus speech is simultaneously scheduled).

In various embodiments, the wireless communication system 100 can be configured to provide and employ 5G wireless networking features and functionalities. 5G wireless communication networks are expected to fulfill the demand of exponentially increasing data traffic and to allow people and machines to enjoy gigabit data rates with virtually zero latency. Compared to 4G, 5G supports more diverse traffic scenarios. For example, in addition to the various types of data communication between conventional UEs (e.g., phones, smartphones, tablets, PCs, televisions, Internet enabled televisions, etc.) supported by 4G networks, 5G networks can be employed to support data communication between smart cars in association with driverless car environments, as well as machine type communications (MTCs).

Figure 2:
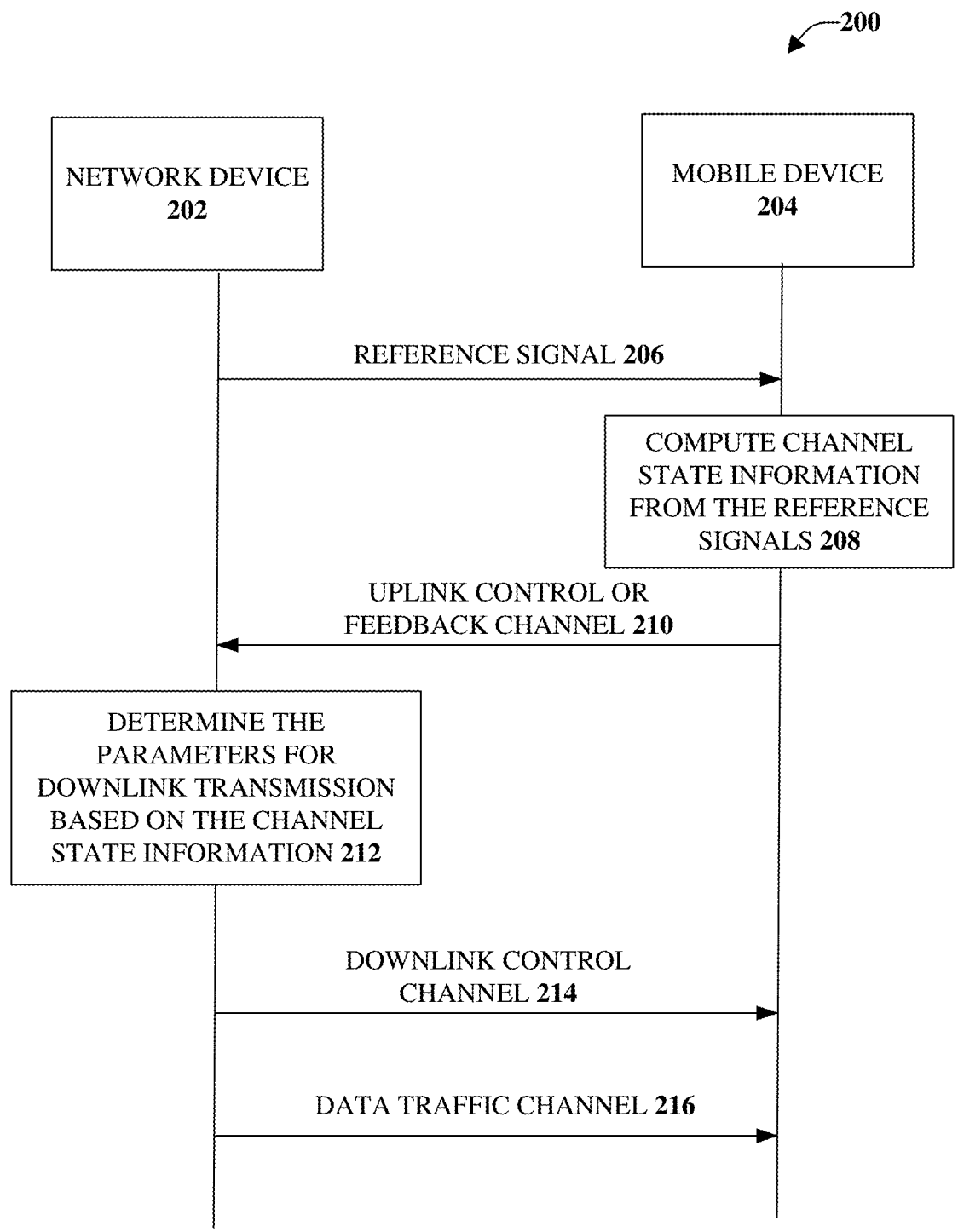
FIG. 2 illustrates an example, non-limiting, message sequence flow chart that can facilitate downlink data transfer in accordance with one or more embodiments described herein.

FIG. 2 illustrates an example, non-limiting, message sequence flow chart 200 that can facilitate downlink data transfer in accordance with one or more embodiments described herein. The message sequence flow chart 200 can be utilized for new radio, as discussed herein. As illustrated, the message sequence flow chart 200 represents the message sequence between a network device 202 (e.g., a General Node B, base station (gNB)) and a mobile device 204. As used herein, the term "network device 202" can be interchangeable with (or include) a network, a network controller or any number of other network components. One or more pilot signals and/or reference signals 206 can be transmitted from the network device 202 to the mobile device 204. The one or more pilot signals and/or reference signals 206 can be cell specific and/or user equipment specific signals. The one or more pilot signals and/or reference signals 206 can be beamformed or non-beamformed.

Based on the one or more pilot signals and/or reference signals 206, the mobile device 204 can compute the channel estimates and can compute the one or more parameters needed for channel state information (CSI) reporting, as indicated at 208. The CSI report can comprise, for example, channel quality indicator (CQI), preceding matrix index (PMI), rank information (RI), Channel State Information Reference Signal (CSI-RS) Resource Indicator (CRI the same as beam indicator), and so on, or any number of other types of information.

The CSI report can be sent from the mobile device 204 to the network device 202 via a feedback channel (e.g., uplink control or feedback channel 210). The CSI report can be sent on request from the network device 202, a-periodically, and/or the mobile device 204 can be configured to report periodically.

The network device 202, which can comprise a scheduler, can use the CSI report for determining the parameters for scheduling of the particular mobile device 204. For example, as indicated at 212, the network device 202 can determine the parameters for downlink transmission based on the channel state information. The parameters for downlink transmission can include but are not limited to: Modulation and Coding Scheme (MCS), power, Physical Resource Blocks (PRBs), and so on.

The network device 202 can send the scheduling parameters to the mobile device 204 in a downlink control channel (e.g., downlink control channel 214). Upon or after the scheduling parameter information is transmitted, the actual data transfer can take place from the network device 202 to the mobile device 204 over the data traffic channel 216.

Downlink reference signals are predefined signals occupying specific resource elements within the downlink time-frequency grid. There are several types of downlink reference signals that are transmitted in different ways and used for different purposes by the receiving terminal (e.g., the mobile device 204). For example, downlink reference signals can include CSI reference signals (CSI-RS) and demodulation reference signals (DM-RS).

CSI reference signals are specifically intended to be used by terminals (e.g., the mobile device 204) to acquire channel-state information (CSI) and beam specific information (beam RSRP). In 5G, CSI-RS is mobile device specific. Therefore, the CSI-RS can have a significantly lower time/frequency density.

Demodulation reference signals (also sometimes referred to as User Equipment (UE)-specific reference signals), are specifically intended to be used by terminals for channel estimation for data channel. The label "UE-specific" relates to the fact that each demodulation reference signal is intended for channel estimation by a single terminal. That specific reference signal is then only transmitted within the resource blocks assigned for data traffic channel transmission to that terminal.

Downlink reference signals can also include Phase Tracking Reference Signals (PT-RS) and Tracking Reference Signals (TRS). Other than the above-mentioned reference signals, there are other reference signals, namely phase tracking and tracking and sounding reference signals, which can be used for various purposes.

An uplink control channel carries information about Hybrid Automatic Repeat Request (HARQ-ACK) information corresponding to the downlink data transmission, and channel state information. The channel state information can comprise CSI-RS Resource Indicator (CRI), Rank Indicator (RI), Channel Quality Indicator (CQI), Precoding Matrix Indicator (PMI), Layer Indicator, and so on. The CSI can be divided into at least two categories. For example, a first category can be for subband and a second category can be for wideband. The configuration of subband and/or wideband CSI reporting can be performed through Radio Resource Control (RRC) signaling as part of CSI reporting configuration. Table 1 below illustrates example contents of an example CSI report for both wideband and subband. Specifically, Table 1 illustrates the contents of a report for PMI format indicator=Wideband, CQI format indicator=wideband and for PMI format indicator=subband, CQI format indicator=subband.

TABLE 1

| PMI-FormatIndicator = widebandPMI and CQI-FormatIndicator = widebandCQI | PMI-FormatIndicator = subbandPMI or CQI-FormatIndicator = subbandCQI | | |
|---|---|---|---|
| | | CSI Part II | |
| | CSI Part I | wideband | Subband |
| CRI | CRI | Wideband CQI for the second TB | Subband differential CQI for the second TB of all even subbands |
| Rank Indicator | Rank Indicator | PMI wideband (X1 and X2) | PMI subband information fields $X_2$ of all even subbands |
| Layer Indicator | Layer Indicator | — | Subband differential CQI for the second TB of all odd subbands |
| PMI wideband (X1 and X2) | Wideband CQI | — | PMI subband information fields $X_2$ of all odd subbands |
| Wideband CQI | Subband differential CQI for the first TB | — | — |

It is noted that for NR, the subband can be defined according to the bandwidth part of the Orthogonal Frequency-Division Multiplexing (OFDM) in terms of PRBs as shown in Table 2 below, which illustrates example, non-limiting, configurable subband sizes. The subband configuration can also be performed through RRC signaling.

TABLE 2

| Carrier bandwidth part (PRBs) | Subband Size (PRBs) |
|---|---|
| <24 | N/A |
| 24-72 | 4, 8 |
| 73-144 | 8, 16 |
| 145-275 | 16, 32 |

According to the 5G NR standard, the UE should report subband CQI as a differential CQI. This can be performed to reduce the uplink overhead, for example. The differential subband CQI is defined as: For each sub-band index s, a 2-bit sub-band differential CQI is defined as: Sub-band Offset level (s)=wideband CQI index—sub-band CQI index (s). The mapping from the two-bit wideband differential CQI values to the offset level is shown in Table 3 below. Specifically, Table 3 illustrates mapping sub band differential CQI value to offset level.

TABLE 3

| Sub band differential CQI value | Offset level |
|---|---|
| 0 | 0 |
| 1 | 1 |
| 2 | ≥2 |
| 3 | ≤−1 |

The downlink control channel (PDCCH) can carry information about the scheduling grants. This can comprise a number of MIMO layers scheduled, transport block sizes, modulation for each codeword, parameters related to HARQ, subband locations, and so on. It is noted that all Downlink Control Information (DCI) formats might not use and/or might not transmit all the information as shown above. In general, the contents of PDCCH depends on transmission mode and DCI format.

In some cases, the following information can be transmitted by means of the downlink control information (DCI) format: carrier indicator, identifier for DCI formats, bandwidth part indicator, frequency domain resource assignment, time domain resource assignment, Virtual Resource Block (VRB)-to-PRB mapping flag, PRB bundling size indicator, rate matching indicator, Zero Power (ZP) CSI-RS trigger, modulation and coding scheme for each Transport Block (TB), new data indicator for each TB, redundancy version for each TB, HARQ process number, downlink assignment index, Transmit Power Control (TPC) command for uplink control channel, Physical Uplink Control Channel (PUCCH) resource indicator, Physical Downlink Shared Channel (PDSCH)-to-HARQ feedback timing indicator, antenna port(s), transmission configuration indication, Sounding Reference Signal (SRS) request, Code Block Group (CBG) transmission information, CBG flushing out information, Demodulation Reference Signal (DMRS) sequence initialization, and so on.

Figure 3:
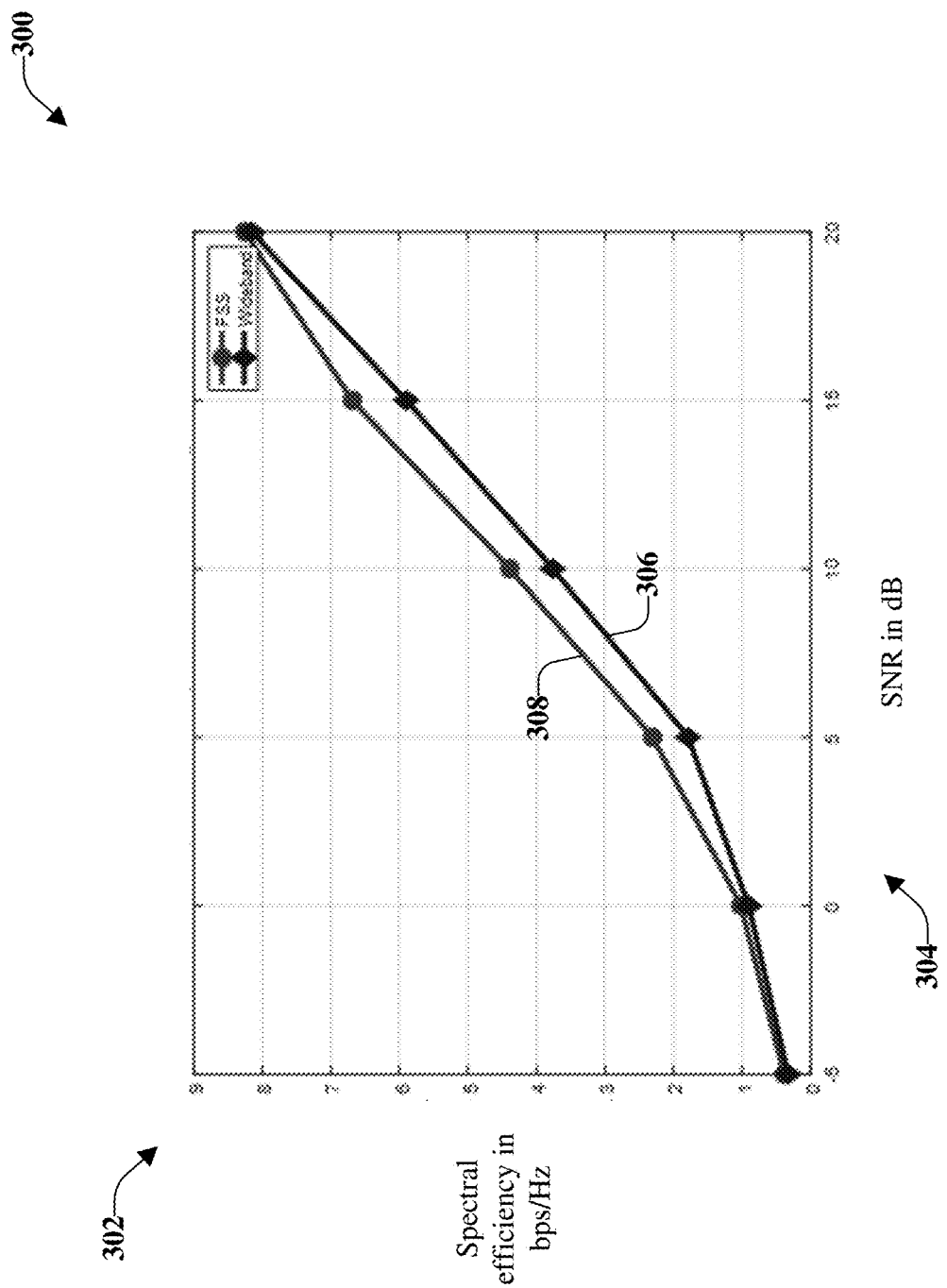
FIG. 3 illustrates an example, non-limiting, chart of link performance with frequency selection scheduling according to an aspect.

As mentioned above, the 5G NR standard provides mechanisms to report the subband CQI and subband PMI in addition to the wideband CQI and PMI. FIG. 3 illustrates an example, non-limiting, chart 300 of link performance with frequency selection scheduling according to an aspect. The vertical axis 302 represents spectral efficiency in bits per second per Hertz (bps/Hz). Further, the horizontal axis 304 represents Signal to Noise Ratio (SNR) in Decibels (dB).

Plot 306 illustrates the link performance with wideband scheduling and plot 308 illustrates the link performance with Frequency Selective Scheduling (FSS) scheduling. For example, FIG. 3 illustrates the link performance when the network (e.g., network device) schedules the UE with subband MCS/CQI as reported by the UE for TDL-A channel. It can be observed that significant gains can be achieved when the network uses the frequency selective scheduling. In this example, the gains are of the order of around fifteen percent (15%).

However, a drawback with this technique is that the UE has to report the CQI for each subband. In a similar manner, the UE has to report PMI for each subband. In an example, for reporting wideband CQI/PMI, the UE uses 4+5 bits to report the preferred CQI and PMI. However, if the network communicates to the UE to report subband CQI/PMI, and, for example, the number of subbands are 17, then, thirty-four (34) bits (e.g., 2*17=34) are used to report the subband CQI. In a similar manner, thirty-four (34) bits (e.g., 2*17=34) are used for reporting PMI. Accordingly, an additional overhead of sixty-eight (68) bits are used for reporting subband PMI/CQI. This implies that for performing FSS the overhead for reporting the subband CQO/PMI is sixty-eight (68) bits. Therefore, even though there can be a gain in the downlink, the performance in the uplink is impacted due to the additional uplink overhead. To overcome the above as well as other issues, the disclosed aspects provide an efficient solution for achieving frequency selective scheduling gains in 5G systems without impacting the uplink performance.

Methods that can be implemented in accordance with the disclosed subject matter, will be better appreciated with reference to various flow charts. While, for purposes of simplicity of explanation, the methods are shown and described as a series of blocks, it is to be understood and appreciated that the disclosed aspects are not limited by the number or order of blocks, as some blocks can occur in different orders and/or at substantially the same time with other blocks from what is depicted and described herein. Moreover, not all illustrated blocks can be required to implement the disclosed methods. It is to be appreciated that the functionality associated with the blocks can be implemented by software, hardware, a combination thereof, or any other suitable means (e.g., device, system, process, component, and so forth). Additionally, it should be further appreciated that the disclosed methods are capable of being stored on an article of manufacture to facilitate transporting and transferring such methods to various devices. Those skilled in the art will understand and appreciate that the methods could alternatively be represented as a series of interrelated states or events, such as in a state diagram.

Figure 4:
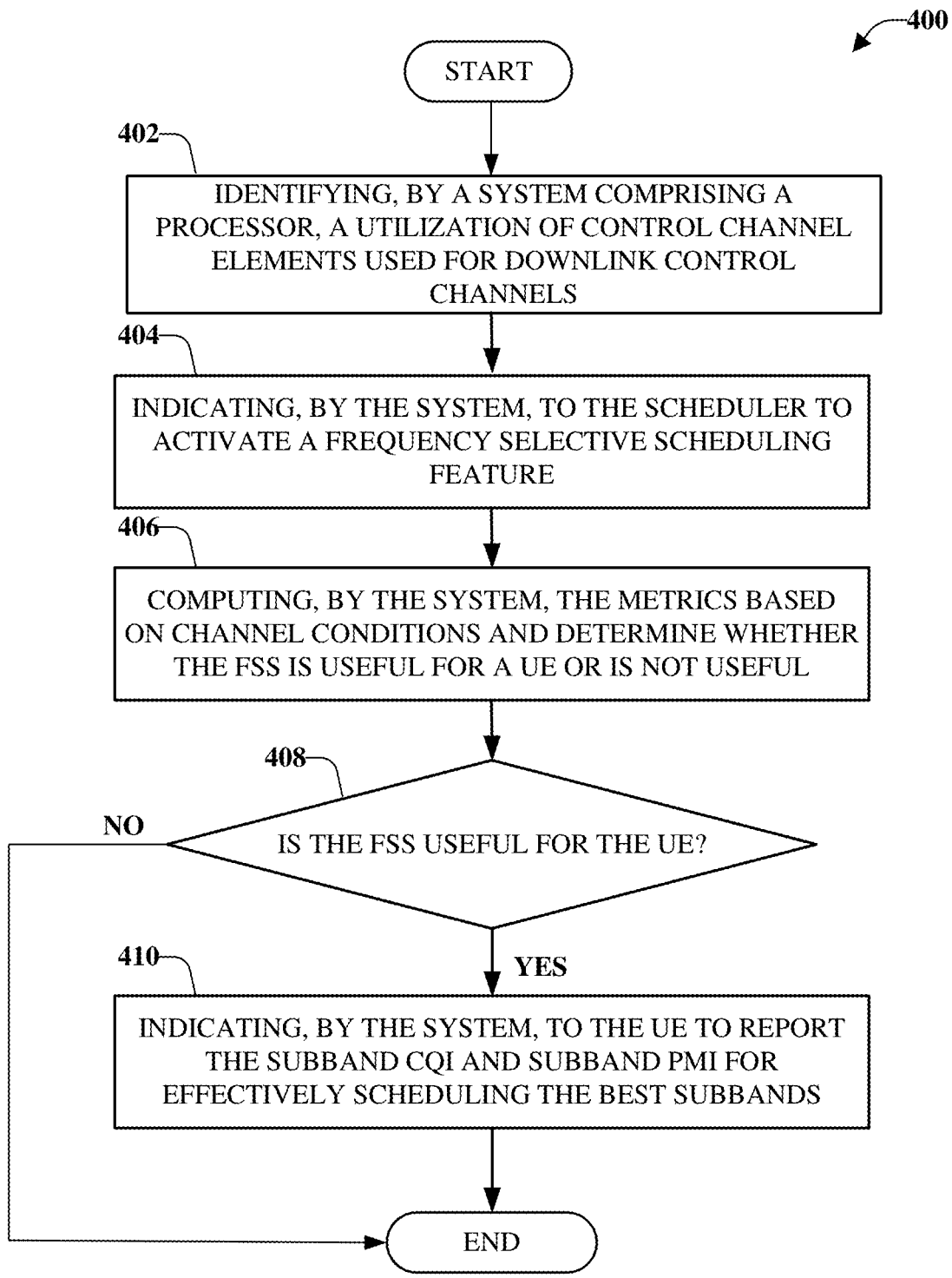
FIG. 4 illustrates a flow diagram of an example, non-limiting, computer-implemented method for facilitating frequency selective scheduling in advanced networks in accordance with one or more embodiments described herein.

The various aspects discussed herein can perform frequency selective scheduling in wireless communication systems. For example, the wireless communication systems can be OFDMA wireless communication systems. FIG. 4 illustrates a flow diagram of an example, non-limiting, computer-implemented method 400 for facilitating frequency selective scheduling in advanced networks in accordance with one or more embodiments described herein. Repetitive description of like elements employed in other embodiments described herein is omitted for sake of brevity.

In some implementations, a system comprising a processor can perform the computer-implemented method 400 and/or other methods discussed herein. In other implementations, a device comprising a processor can perform the computer-implemented method 400 and/or other methods discussed herein. In other implementations, a machine-readable storage medium, can comprise executable instructions that, when executed by a processor, facilitate performance of operations, which can be the operations discussed with respect to the computer-implemented method 400 and/or other methods discussed herein. In further implementations, a computer readable storage device comprising executable instructions that, in response to execution, cause a system comprising a processor to perform operations, which can be operations discussed with respect to the computer-implemented method 400 and/or other methods discussed herein.

At 402 of the computer-implemented method 400, a system comprising a processor can identify a utilization of control channel elements used for downlink control channels. Further, at 404 of the computer-implemented method 400, the system can indicate a scheduler to switch on (e.g., activate) a Frequency Selective Scheduling (FSS) feature.

Upon or after activation of the FSS feature (e.g., the feature is ON), the system can, at 406 of the computer-implemented method 400, compute the metrics based on channel conditions. At 408, a determination is made whether the FSS is useful for a given UE or is not useful. If not useful ("NO"), the computer-implemented method 400 ends. If useful (e.g., the determination at 408 is "YES"), at 410 the system can indicate to the UE to report the subband CQI and subband PMI for effectively scheduling the best subbands.

The disclosed aspects include multiple embodiments, which can be implemented both at the network node device and at the UE. For example, the network node device can identify a number of control channel elopements or a load of the cell and provide information to a network scheduler to switch on a FSS feature. In another example, the network node device can obtain the parameters and can compute the performance metric to decide whether to ask for subband CQOI/PMI as part of CSI reporting configurations. According to a further example, the UE can report subband CQI/PMI based on the signaling received from the network node device.

The disclosed aspects can provide various advantages such as significant gains in sector throughput and cell edge user throughput as the network device obtains the information about the best subband and can schedule the best subband. Another advantage can be that the impact to the uplink overhead scales as the FSS feature is enabled when the load is less and, in addition, the network can request the subband PMI/CQI for those UEs only which can benefit from FSS (e.g., the subband PMI/CQI is not requested from UEs that do not benefit from FSS.

It is noted that the various aspects are discussed with respect to downlink data transmission for MIMO systems. However, the same principle, or similar principles, are applicable for uplink and side link systems.

The FSS feature can provide benefits when the load of the cell is low. This is because the network cannot obtain the information about the subband CQI/PMI if the load is very high due to the limited availability of uplink resources. For example, the network node device can decide whether to switch on FSS feature or not. For example, if the number of connected UEs is very large the network device can decide to switch off the FSS feature. In another embodiment the network device can monitor the number of control channel elements used as this indicates the load of the system. For example, if the number of CCE utilizations is less than, for example, C_th, then the network can decide to switch on the FSS feature. As an example, C_th can be around forty-five percent to about fifty percent (45-50%). However, the disclosed aspects are not limited to this percentage and other values can be utilized.

In another embodiment the network device can use the number of C-RNTI's currently in use for the cell and decide about the load of the system. Once it obtains the load information, the network device can switch on the FSS feature when the load of the cell is less than a defined quantity.

Figure 5:
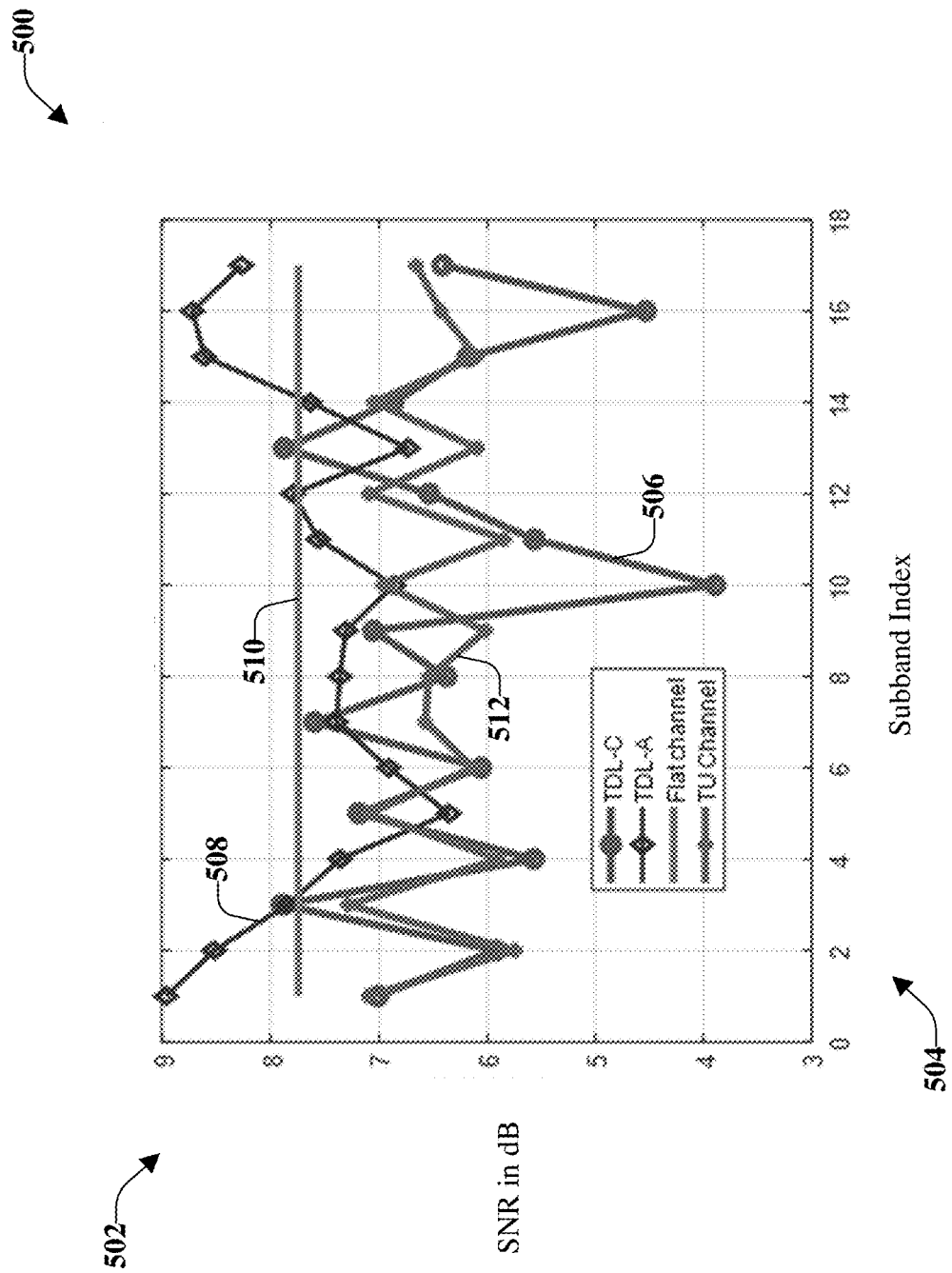
FIG. 5 illustrates an example, non-limiting, chart of signal to noise ratio for each subband at a geometry equal to zero decibels in accordance with one or more embodiments described herein.

It is noted that the FSS feature can provide a benefit only when the load is lower than a defined load value. However, this feature is not beneficial if the channel between the network device and the UE is not frequency selective. That is, if all the subbands report the same/similar CQI, then the performance with wideband scheduling is almost equal to that of FSS. As an example, FIG. 5 illustrates an example, non-limiting, chart 500 of signal to noise ratio for each subband at a geometry equal to zero decibels in accordance with one or more embodiments described herein. Repetitive description of like elements employed in other embodiments described herein is omitted for sake of brevity.

The vertical axis 502 represents Signal to Noise Ratio (SNR) in Decibels (dB). Further, the horizontal axis 504 represents subband index. The first plot 506 represents TDL-C; the second plot 508 represents TDL-A; the third plot 510 represents the flat channel; and the fourth plot 512 represents the TU channel.

Figure 6:
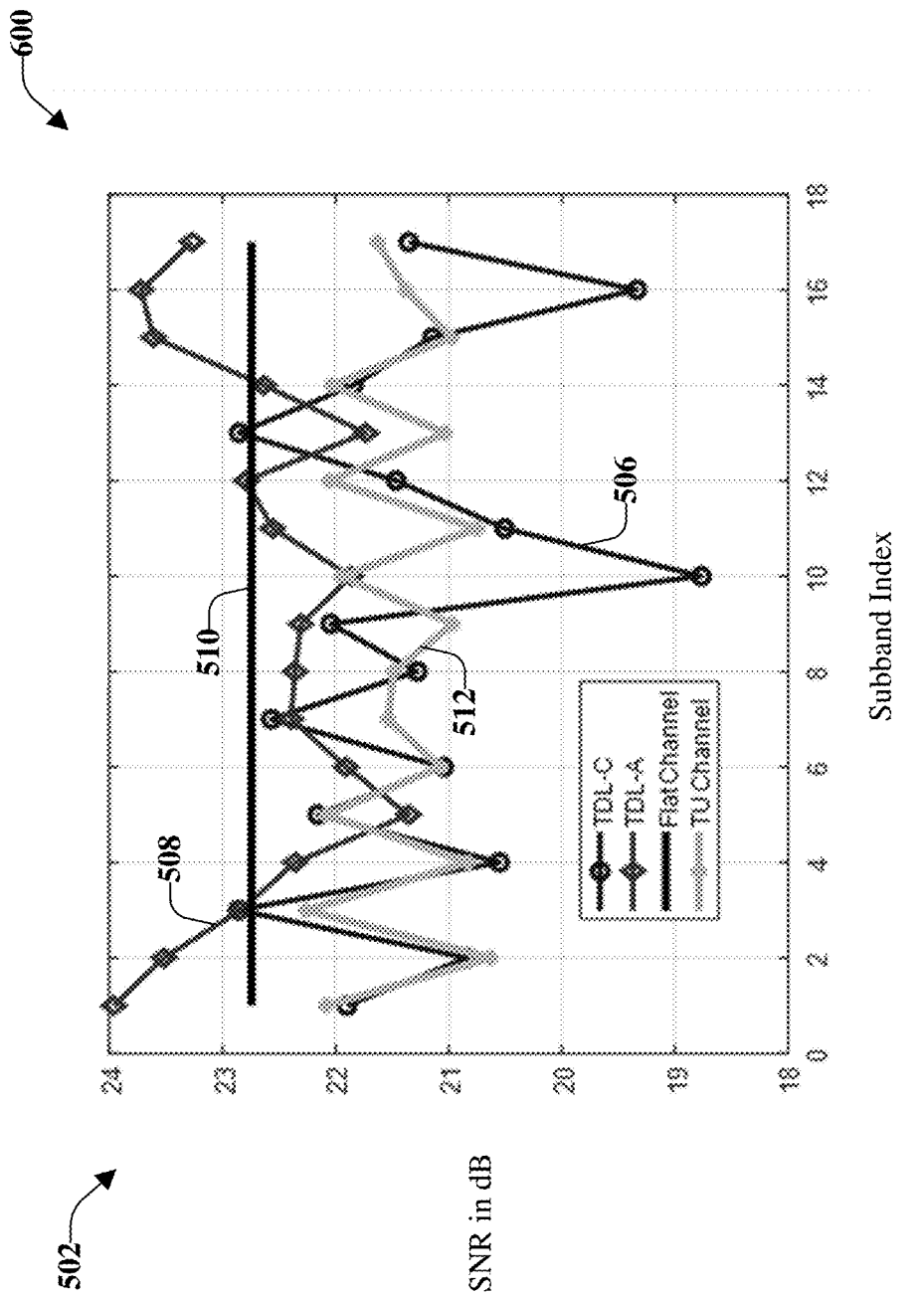
FIG. 6 illustrates an example, non-limiting, chart of signal to noise ratio for each subband at a geometry equal to fifteen decibels in accordance with one or more embodiments described herein.

Further, FIG. 6 illustrates an example, non-limiting, chart 600 of signal to noise ratio for each subband at a geometry equal to fifteen decibels in accordance with one or more embodiments described herein. Repetitive description of like elements employed in other embodiments described herein is omitted for sake of brevity.

The vertical axis 502 represents SNR in dBs. Further, the horizontal axis 504 represents subband index. The first plot 506 represents TDL-C; the second plot 508 represents TDL-A; the third plot 510 represents the flat channel; and the fourth plot 512 represents the TU channel.

FIG. 5 and FIG. 6 demonstrate the SNR obtained with subband CQI/PMI reporting at geometry equal to 0 dB and 15 dB, respectively for different channels which differ in the delay spread of the channel.

For example, for the frequency flat channel (e.g., the third plot 510) and the TU channel (e.g., the fourth plot 512) per subband CQI is almost the same. Accordingly, there is no benefit of subband CQI/PMI reporting for these UEs. However, for the channels such as the TDL-C (e.g., the first plot 506) and TDL-A (e.g., the second plot 508) the SNR of certain subbands varies significantly. In these cases, FSS can provide benefits as compared to wideband scheduling.

Therefore, according to some implementations, the network device can obtain the information about the channel. The information can include, for example, delay spread between the UE and the network device. There can be multiple techniques utilized to obtain information about the delay spread of the channel between the UE and the network device. One technique to obtain information about the delay spread can be to estimate the uplink channel from sounding reference signal and check how many paths are available. In another technique, the network device can switch on the FSS feature (e.g., send the subband CQI/PMI request to the UE) and can periodically (or at another interval) check the variation of the reported CQIs of each subband. If the variation is very small, then the network device can switch off the subband CQI/PMI request.

According to some implementations, upon or after the UE receives from network node about the subband CQI/PMI based on the load and the channel conditions, the UE can compute per subband CQI and PMI. Further, the UE can report this information to the network node using PUSCH or PUCCH.

Figure 7:
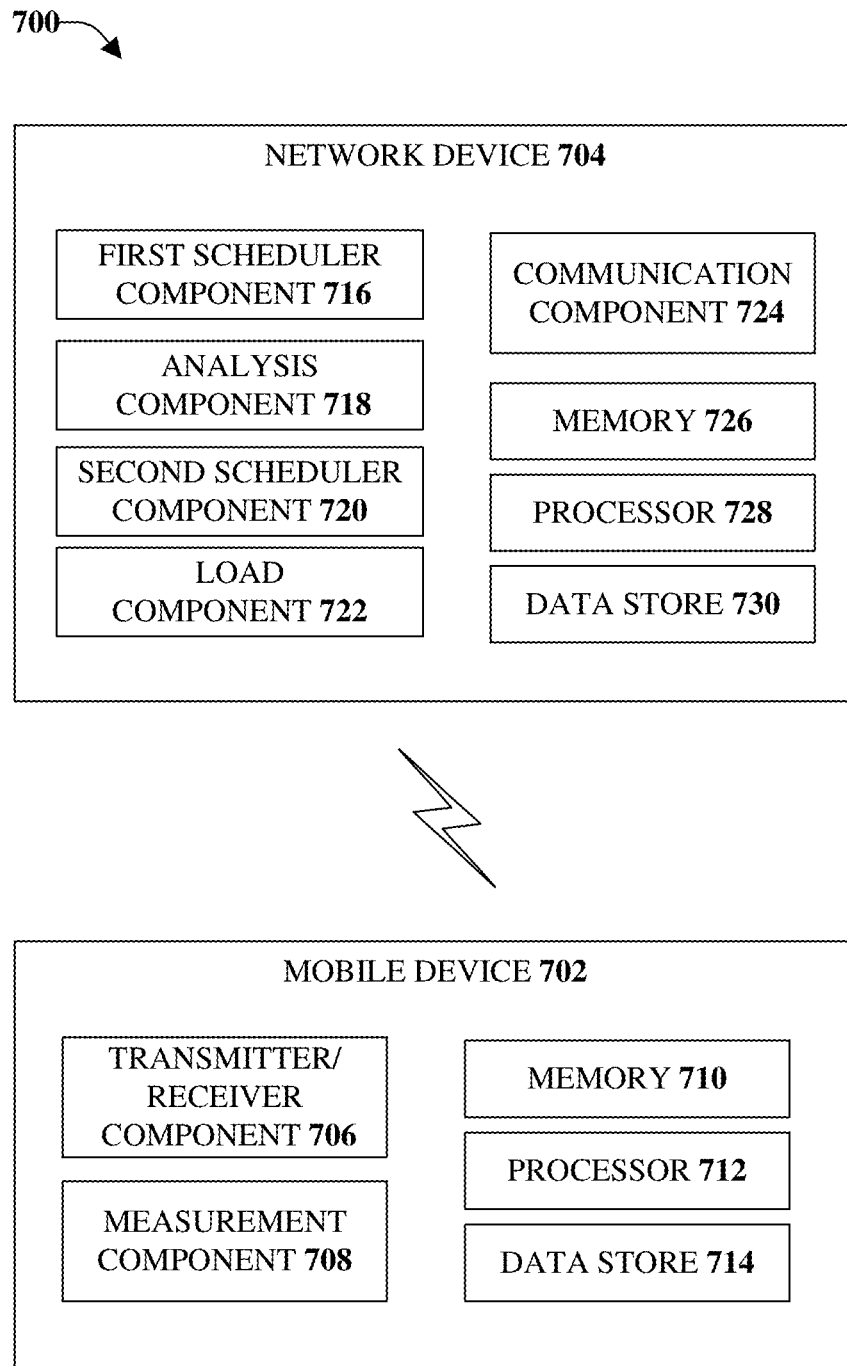
FIG. 7 illustrates an example, non-limiting, system for frequency selective scheduling in advanced networks in accordance with one or more embodiments described herein.

FIG. 7 illustrates an example, non-limiting, system 700 for frequency selective scheduling in advanced networks in accordance with one or more embodiments described herein. Aspects of systems (e.g., the system 700 and the like), apparatuses, or processes explained in this disclosure can constitute machine-executable component(s) embodied within machine(s) (e.g., embodied in one or more computer readable mediums (or media) associated with one or more machines). Such component(s), when executed by the one or more machines (e.g., computer(s), computing device(s), virtual machine(s), and so on) can cause the machine(s) to perform the operations described.

In various embodiments, the system 700 can be any type of component, machine, device, facility, apparatus, and/or instrument that comprises a processor and/or can be capable of effective and/or operative communication with a wired and/or wireless network. Components, machines, apparatuses, devices, facilities, and/or instrumentalities that can comprise the system 700 can include tablet computing devices, handheld devices, server class computing machines and/or databases, laptop computers, notebook computers, desktop computers, cell phones, smart phones, consumer appliances and/or instrumentation, industrial and/or commercial devices, hand-held devices, digital assistants, multimedia Internet enabled phones, multimedia players, and the like.

The system can be configured to determine a first group of devices for which subband reporting should be performed and a second group of devices for which wideband reporting should be performed. In an example, if a network load is high (e.g., there are many devices present in a cell), activation of subband can have no benefit since all resources are being utilized due to the load on the network.

As discussed herein, provided are efficient activation/deactivation aspects and implementation criteria of Downlink Frequency Selective Scheduling (DL FSS) feature. DL FSS is a feature that allows the eNodeB to schedule users based upon their unique downlink channel quality by utilizing aperiodic sub-band channel quality index (CQI) reports. Although this feature has several benefits, it can increase PDCCH CCE utilization which might affect capacity and performance. The disclosed aspects can improve network performance by utilizing DL FSS feature on the best way possible without negatively impacting capacity. The disclosed aspects can made it possible to actually utilize DL FSS feature to improve downlink user and cell throughput, increased high modulation schemes usage, reduced latency and improved RLC layer block error rate (RLC BLER) and keep PDCCH CCE utilization increase at minimal level. Wireless technology is moving towards 5G which includes low latency requirement, increase use of higher modulation schemes, massive MIMO usage, and so on. The disclosed aspects can help in all 5G aspects and it fits well with direction of the technology. Further, the disclosed aspects and related implementation criteria can be an efficient way to utilize DL FSS feature worldwide.

Further, the disclosed aspects can ensure efficient implementation and can provide benefit without negatively impacting the network, taking advantage of it in the best way possible. The disclosed aspects can improve user throughput, cell throughput, high modulation schemes usage increase, RLC BLER, downlink latency which all reflect on greater and better network performance customer experience. The disclosed aspects can also reduce cost and can reduce the potential need for carrier additions. If DL FSS is used without the disclosed aspects, PDCCH CCE resources will be exhausted quickly which will lead to capacity triggers and hence need for new carrier to be added. That scenario can be avoided as discussed herein.

As illustrated in FIG. 7, the system 700 can include a mobile device 702 and a network device 704. The network device 704 can be included in a group of network devices of a wireless network. Although only a single communication device and a single network device are shown and described, the various aspects are not limited to this implementation. Instead, multiple communication devices and/or multiple network devices can be included in a communications system.

The mobile device 702 can include a transmitter/receiver component 706, a measurement component 708, at least one memory 710, at least one processor 712, and at least one data store 714. The network device 704 can include a first scheduler component 716, an analysis component 718, a second scheduler component 720, a load component 722, communication component 724, at least one memory 726, at least one processor 728, and at least one data store 730.

The first scheduler component 716 can facilitate an activation of a frequency selective scheduling based on identification of control channel elements used for a downlink control channel. It is noted that although illustrated and described with respect to the network device 704, the first scheduler component 716 could be located external to the network device 704 (e.g., included in another network device).

According to some implementations, prior to the first scheduler component 716 activating the frequency selective scheduling, the load component 722 can determine a traffic load with the communications network and/or within a cell of the communications network. For example, the load component 722 can determine a number of connected user equipment devices, including the mobile device 702, within the network (or cell) is below a defined level of user equipment devices. According to some implementations, if the number of connected user devices, including the user equipment device, within the network (or cell) is at or above the defined level of user equipment devices, the first scheduler component 716 does not activate the frequency selective scheduling. Further, if, while the frequency selective scheduling is activated, it is determined, by the load component 722 that the number of connected user devices, including the user equipment device, within the network (or cell) is at or above the defined level of user equipment devices, the first scheduler component 716, or another system component, can facilitate a deactivation of the frequency selective scheduling.

Alternatively, or additionally, according to some implementations, the load component 722 can monitor a number of control channel elements in use. Based on the number of control channel elements in use being below a defined utilization level, the first scheduler component 716 can facilitate activation of the frequency selective scheduling. However, if the number of control channel elements in use is determined to be at or above a defined utilization level the first scheduler component 716 does not facilitate activation of the frequency selective scheduling. Further, if the frequency selective scheduling is already activated and it is determined that the number of control channel elements is at or above a defined utilization level, the first scheduler component 716 can facilitate a deactivation of the frequency selective scheduling.

Alternatively, or additionally, the load component 722 can determine the network load by obtaining information indicative of a quantity of cell radio network temporary identities within a communications network (or a cell). If the quantity of cell radio network temporary identities within the communications network fails to satisfy a defined quantity, the first scheduler component 716 can activate the frequency selective scheduling. If the quantity of cell radio network temporary identities is determined to satisfy the defined quantity, the first scheduler component 716 can determine not to activate the frequency selective scheduling or to deactivate the frequency selective scheduling, if already activated.

Based on the activation of a frequency selective scheduling by the first scheduler component 716, the analysis component 718 can determine whether the frequency selective scheduling is beneficial to the mobile device 702. For example, the determination by the analysis component 718 could be based on a result of a metric determined based on channel conditions.

If the analysis component 718 determines frequency selective scheduling is beneficial to the mobile device 702, the communication component 724 (or another system component) can instruct the mobile device 702 to report a subband channel quality indicator and a subband precoding matrix index.

For example, prior to instructing the mobile device 702 to report a subband channel quality indicator and a subband precoding matrix index, the analysis component 718 can determine a first signal to noise value of a first subband for a first channel and a second signal to noise value of a second subband of a second channel. If the first signal to noise value and the second signal to noise value are different by more than a defined amount, the mobile device 702 can be instructed to provide the information.

Alternatively, or additionally, prior to instructing the mobile device 702 to report a subband channel quality indicator and a subband precoding matrix index, the analysis component 718 can determine a delay spread between the user equipment device and a network node device of a wireless network. For example, determining the delay spread can comprise estimating an uplink channel from a sounding reference signal and determining a number of paths available.

In another example, determining the delay spread can comprise evaluating a variation of respective reported channel quality indicators of subbands of a group of subbands. Further, to this example, deactivation of the frequency selective scheduling can be facilitated based on a second determination that the variation of the respective reported channel quality indicators does not satisfy a defined variation.

The measurement component 708 of the mobile device 702 can measure the subband channel quality indicator and the subband precoding matrix. Further, the mobile device 702 can report the subband channel quality indicator and the subband precoding matrix (e.g., via the transmitter/receiver component 706). Based on the information related to the channel quality indicator and the subband precoding matrix, the second scheduler component 720 can schedule the user equipment device with one or more subbands.

The transmitter/receiver component 706 can be configured to transmit to, and/or receive data from, the network device 704, other network devices, and/or other mobile devices. Through the transmitter/receiver component 706, the mobile device 702 can concurrently transmit and receive data, can transmit and receive data at different times, or combinations thereof.

The communication component 724 can be configured to transmit to, and/or receive data from, the mobile device 702, other mobile devices, and/or other network devices. Through the communication component 724, the network device 704 can concurrently transmit and receive data, can transmit and receive data at different times, or combinations thereof.

The at least one memory 710 can be operatively connected to the at least one processor 712. The at least one memory 710 can store executable instructions that, when executed by the at least one processor 712 can facilitate performance of operations. Further, the at least one processor 712 can be utilized to execute computer executable components stored in the at least one memory 710.

For example, the at least one memory 710 can store protocols associated with facilitating frequency selective scheduling in advanced networks as discussed herein. Further, the at least one memory 710 can facilitate action to control communication between the mobile device 702, the network device 704, other mobile devices, and/or other network devices, such that the mobile device 702 can employ stored protocols and/or algorithms to achieve improved communications in a wireless network as described herein.

Further, the at least one memory 726 can be operatively connected to the at least one processor 728. The at least one memory 726 can store executable instructions that, when executed by the at least one processor 728 can facilitate performance of operations. Further, the at least one processor 728 can be utilized to execute computer executable components stored in the at least one memory 726.

For example, the at least one memory 726 can store protocols associated with facilitating frequency selective scheduling in advanced networks as discussed herein. Further, the at least one memory 726 can facilitate action to control communication between the network device 704, the mobile device 702, other network devices, and/or other mobile devices, such that the network device 704 can employ stored protocols and/or algorithms to achieve improved communications in a wireless network as described herein.

It should be appreciated that data stores (e.g., memories) components described herein can be either volatile memory or nonvolatile memory, or can include both volatile and nonvolatile memory. By way of example and not limitation, nonvolatile memory can include read only memory (ROM), programmable ROM (PROM), electrically programmable ROM (EPROM), electrically erasable ROM (EEPROM), or flash memory. Volatile memory can include random access memory (RAM), which acts as external cache memory. By way of example and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM). Memory of the disclosed aspects are intended to comprise, without being limited to, these and other suitable types of memory.

The at least one processor 712 can facilitate respective analysis of information related to facilitating frequency selective scheduling in advanced networks. The at least one processor 712 can be a processor dedicated to analyzing and/or generating information received, a processor that controls one or more components of the mobile device 702, and/or a processor that both analyzes and generates information received and controls one or more components of the mobile device 702.

In addition, the at least one processor 728 can facilitate respective analysis of information related to facilitating frequency selective scheduling in advanced networks. The at least one processor 728 can be a processor dedicated to analyzing and/or generating information received, a processor that controls one or more components of the network device 704, and/or a processor that both analyzes and generates information received and controls one or more components of the network device 704.

Further, the term network device (e.g., network node, network node device) is used herein to refer to any type of network node serving mobile devices and/or connected to other network nodes, network elements, or another network node from which the mobile devices can receive a radio signal. In cellular radio access networks (e.g., universal mobile telecommunications system (UMTS) networks), network nodes can be referred to as base transceiver stations (BTS), radio base station, radio network nodes, base stations, NodeB, eNodeB (e.g., evolved NodeB), and so on. In 5G terminology, the network nodes can be referred to as gNodeB (e.g., gNB) devices. Network nodes can also comprise multiple antennas for performing various transmission operations (e.g., MIMO operations). A network node can comprise a cabinet and other protected enclosures, an antenna mast, and actual antennas. Network nodes can serve several cells, also called sectors, depending on the configuration and type of antenna. Examples of network nodes (e.g., network node device 104) can include but are not limited to: NodeB devices, base station (BS) devices, access point (AP) devices, and radio access network (RAN) devices. The network nodes can also include multi-standard radio (MSR) radio node devices, comprising: an MSR BS, an eNode B, a network controller, a radio network controller (RNC), a base station controller (BSC), a relay, a donor node controlling relay, a base transceiver station (BTS), a transmission point, a transmission node, a Remote Radio Unit (RRU), a Remote Radio Head (RRH), nodes in distributed antenna system (DAS), and the like.

Figure 8:
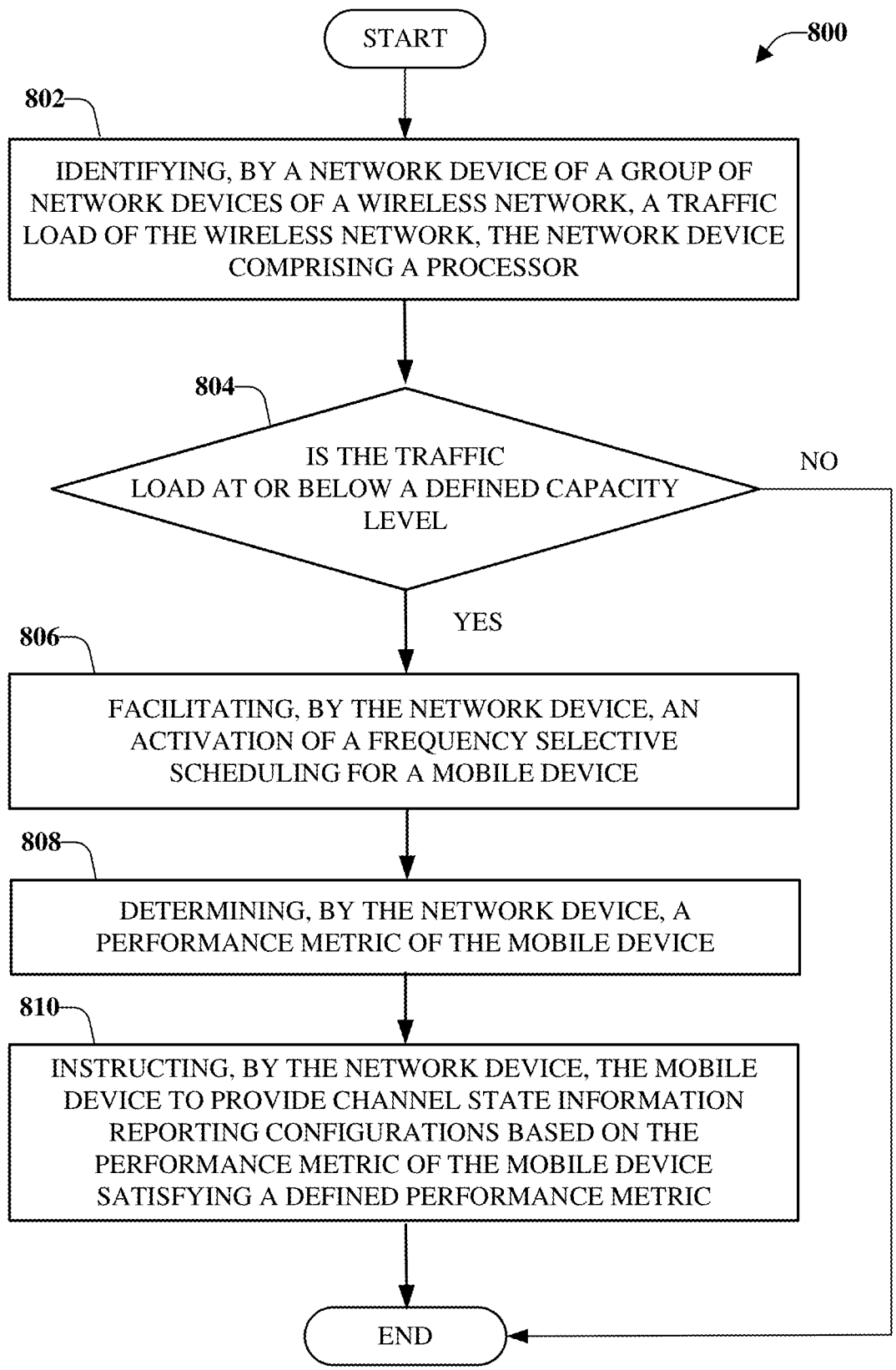
FIG. 8 illustrates a flow diagram of an example, non-limiting, computer-implemented method for evaluating a traffic load of a wireless network for implementation of frequency selective scheduling in advanced networks in accordance with one or more embodiments described herein.

FIG. 8 illustrates a flow diagram of an example, non-limiting, computer-implemented method 800 for evaluating a traffic load of a wireless network for implementation of frequency selective scheduling in advanced networks in accordance with one or more embodiments described herein. Repetitive description of like elements employed in other embodiments described herein is omitted for sake of brevity.

In some implementations, a system comprising a processor can perform the computer-implemented method 800 and/or other methods discussed herein. In other implementations, a device comprising a processor can perform the computer-implemented method 800 and/or other methods discussed herein. In other implementations, a machine-readable storage medium, can comprise executable instructions that, when executed by a processor, facilitate performance of operations, which can be the operations discussed with respect to the computer-implemented method 800 and/or other methods discussed herein. In further implementations, a computer readable storage device comprising executable instructions that, in response to execution, cause a system comprising a processor to perform operations, which can be operations discussed with respect to the computer-implemented method 800 and/or other methods discussed herein.

At 802 of the computer-implemented method 800, a network device of a group of network devices of a wireless network can identify a traffic load of the wireless network (e.g., via the load component 722). A determination can be made, at 804, whether the traffic load of the wireless network is at or below a defined capacity level (e.g., via the analysis component 718). If the traffic load is above the threshold level ("NO"), the method can end. However, if the traffic load is at or below the capacity level ("YES"), at 806, a frequency selective scheduling for a mobile device can be activated (e.g., via the first scheduler component 716).

According to some implementations, the computer-implemented method 800 can continue, at 808, with a determination of a performance metric of the mobile device (e.g., via the analysis component 718). Further, at 810, the network device, can instruct the mobile device to provide channel state information reporting configurations based on the performance metric of the mobile device satisfying a defined performance metric (e.g., via the communication component 724).

In an example, determining the performance metric can include estimating an uplink channel from a sounding reference signal and determining a number of paths available. Further, a delay spread between the mobile device and the network device of the wireless network can be determined based on the number of paths available.

According to some implementations, after a defined interval, the network device can evaluate the traffic load of the wireless network. The network device can facilitate a deactivation of the frequency selective scheduling for the mobile device based on a determination that the traffic load of the wireless network no longer satisfies the defined capacity value.

According to another example, the network device can evaluate a variation of reported channel quality indicators of subbands of a group of subands. The network device can facilitate a deactivation of the frequency selective scheduling based on a determination that a variation of the reported channel quality indicators does not satisfy a defined variation.

Figure 9:
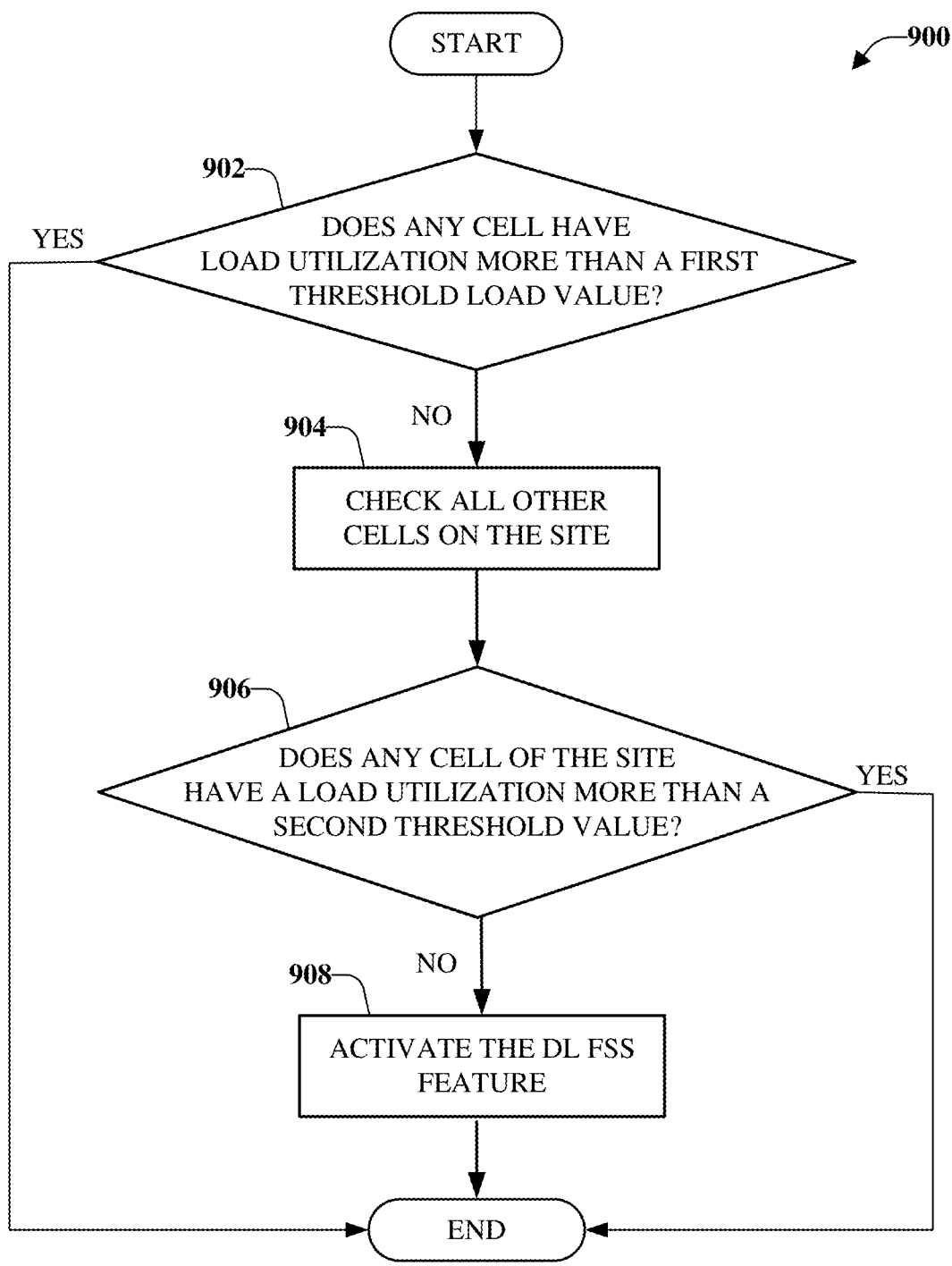
FIG. 9 illustrates a flow diagram of an example, non-limiting, computer-implemented method for activation of a frequency selective scheduling in advanced networks in accordance with one or more embodiments described herein.

FIG. 9 illustrates a flow diagram of an example, non-limiting, computer-implemented method 900 for activation of a frequency selective scheduling in advanced networks in accordance with one or more embodiments described herein. Repetitive description of like elements employed in other embodiments described herein is omitted for sake of brevity.

In some implementations, a system comprising a processor can perform the computer-implemented method 900 and/or other methods discussed herein. In other implementations, a device comprising a processor can perform the computer-implemented method 900 and/or other methods discussed herein. In other implementations, a machine-readable storage medium, can comprise executable instructions that, when executed by a processor, facilitate performance of operations, which can be the operations discussed with respect to the computer-implemented method 900 and/or other methods discussed herein. In further implementations, a computer readable storage device comprising executable instructions that, in response to execution, cause a system comprising a processor to perform operations, which can be operations discussed with respect to the computer-implemented method 900 and/or other methods discussed herein.

The computer-implemented method 900 starts, at 902, when network device comprising a processor can determine whether any cell has a load utilization higher than a first threshold level (e.g., via the load component 722). According to am example, the first threshold level can be around the range of forty to fifty-five percent. However, different percentage values can be utilized for the first threshold level according to various implementations. If any cell has load utilization higher than the first threshold level ("YES"), the computer-implemented method 900 stops.

If no cell has load utilization higher than the first threshold level ("NO"), at 904, all other cells on the site are checked (e.g., via the load component 722). At 906 of the computer-implemented method 900, the network device can determine whether any cell on the site has load utilization higher than a second threshold level (e.g., via the load component 722 and/or the analysis component 718). The second threshold level can be the same level as the first threshold level utilized for the determination, at 902, or it could be another threshold level.

If a cell on the site does have a load utilization higher than the second threshold level ("YES"), the computer-implemented method 900 stops. Alternatively, if there no cells on the site that have a load utilization higher than the second threshold level, at 908 of the computer-implemented method 900, downlink (DL) Frequency Selection Scheduling (FSS) features can be enabled (e.g., via the first scheduler component 716).

Figure 10:
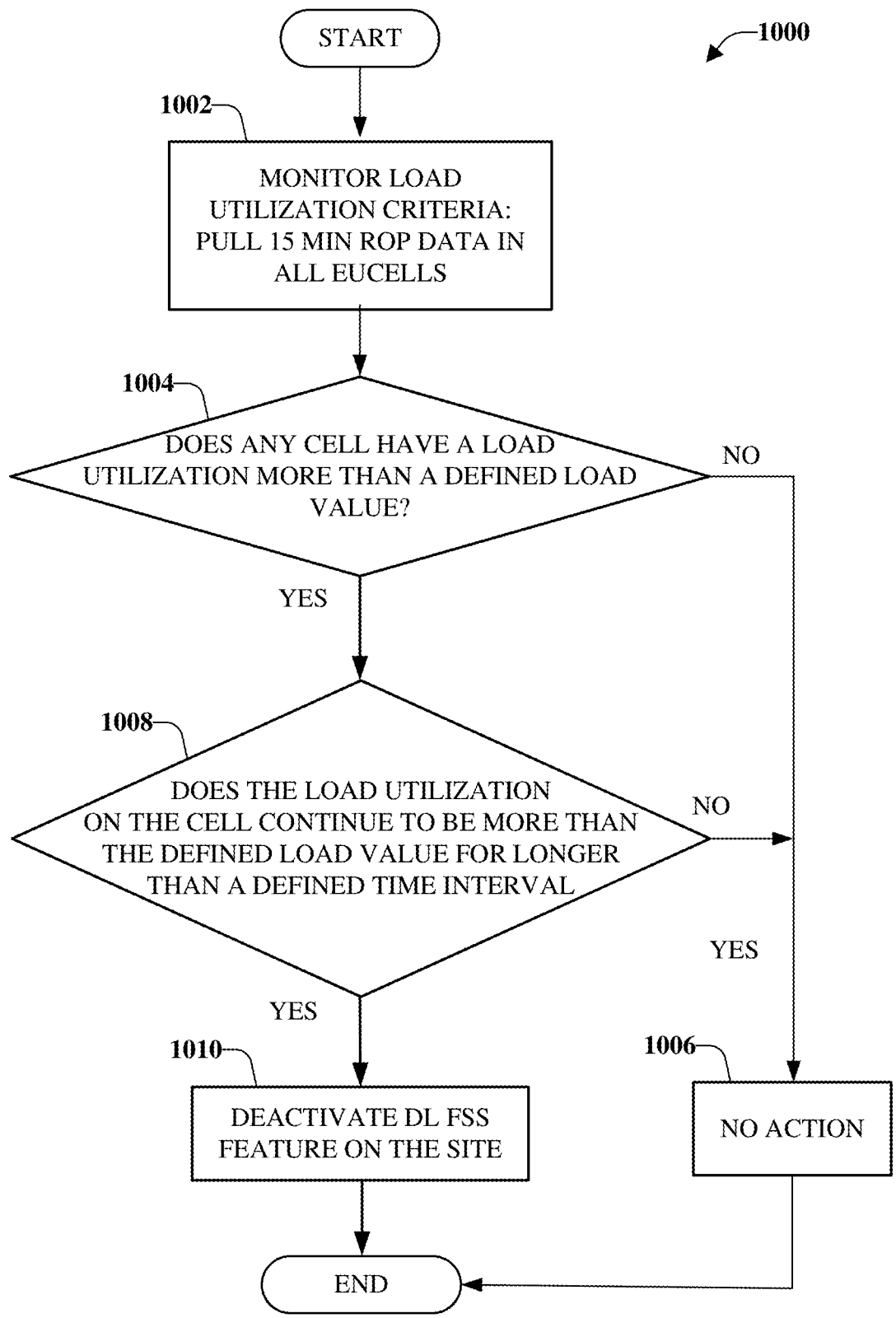
FIG. 10 illustrates a flow diagram of an example, non-limiting, computer-implemented method for deactivation of a frequency selective scheduling in advanced networks in accordance with one or more embodiments described herein.

FIG. 10 illustrates a flow diagram of an example, non-limiting, computer-implemented method 1000 for deactivation of a frequency selective scheduling in advanced networks in accordance with one or more embodiments described herein. Repetitive description of like elements employed in other embodiments described herein is omitted for sake of brevity.

In some implementations, a system comprising a processor can perform the computer-implemented method 1000 and/or other methods discussed herein. In other implementations, a device comprising a processor can perform the computer-implemented method 1000 and/or other methods discussed herein. In other implementations, a machine-readable storage medium, can comprise executable instructions that, when executed by a processor, facilitate performance of operations, which can be the operations discussed with respect to the computer-implemented method 1000 and/or other methods discussed herein. In further implementations, a computer readable storage device comprising executable instructions that, in response to execution, cause a system comprising a processor to perform operations, which can be operations discussed with respect to the computer-implemented method 1000 and/or other methods discussed herein.

The computer-implemented method 1000 starts, at 1002, when a load utilization criteria can be monitored by a network device comprising a processor (e.g., via the load component 722). The load can be monitored for a defined period of time (e.g., 15 minutes of ROP data in all eucells, or another duration). A determination can be made, at 1004, whether any cell has a load utilization higher than a threshold load value e.g., via the load component 722). If it is determined that the load utilizations of all cells are lower than the threshold load value ("NO"), no action is taken, as indicated at 1006, and the computer-implemented method 1000 stops.

Alternatively, if the determination is that at least one cell has a load utilization value that is more than the threshold load value ("YES"), then at 1008 of the computer-implemented method 1000, a determination is made whether the load utilization on that cell continues to be more than the threshold level for longer than a defined time interval e.g., via the load component 722 and/or the analysis component 718). In a specific, non-limiting, example, the defined time interval can be two ROPs (e.g., around thirty minutes). However, other durations can be utilized with the disclosed aspects.

If the determination is that the load utilization is not higher than the defined threshold value for longer then the defined time interval ("NO"), then no action is taken, as indicated at 1006, and the computer-implemented method 1000 stops. However, if the determination, at 1008 is that the load utilization on the cell remains above the defined threshold level for more than the defined time interval ("YES"), at 1010, the DL FSS features of the site can be deactivated (e.g., via the first scheduler component 716).

Figure 11:
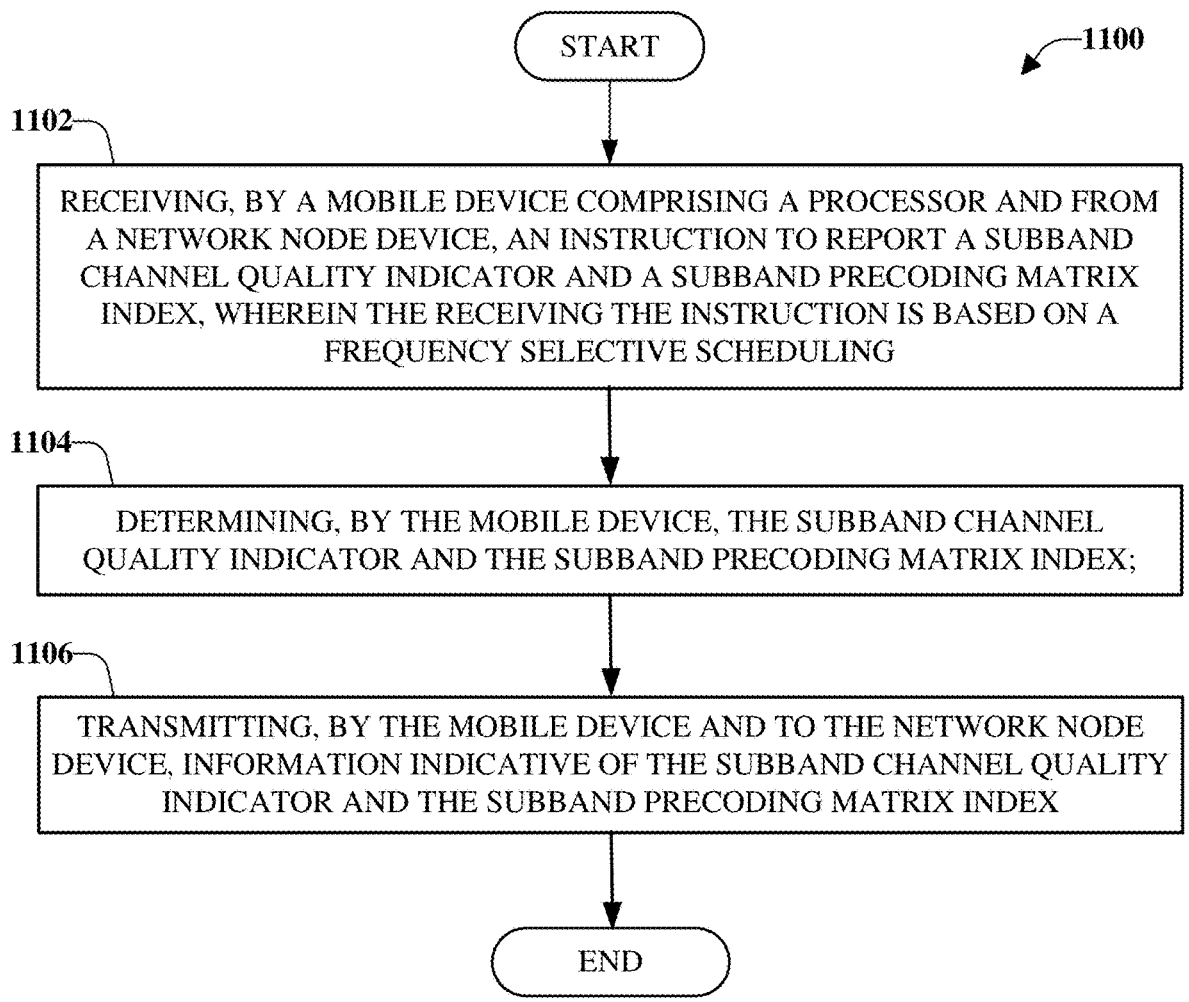
FIG. 11 illustrates a flow diagram of an example, non-limiting, computer-implemented method for deactivation of a frequency selective scheduling in advanced networks in accordance with one or more embodiments described herein.

FIG. 11 illustrates a flow diagram of an example, non-limiting, computer-implemented method 1100 for deactivation of a frequency selective scheduling in advanced networks in accordance with one or more embodiments described herein. Repetitive description of like elements employed in other embodiments described herein is omitted for sake of brevity.

In some implementations, a system comprising a processor can perform the computer-implemented method 1100 and/or other methods discussed herein. In other implementations, a device comprising a processor can perform the computer-implemented method 1100 and/or other methods discussed herein. In other implementations, a machine-readable storage medium, can comprise executable instructions that, when executed by a processor, facilitate performance of operations, which can be the operations discussed with respect to the computer-implemented method 1100 and/or other methods discussed herein. In further implementations, a computer readable storage device comprising executable instructions that, in response to execution, cause a system comprising a processor to perform operations, which can be operations discussed with respect to the computer-implemented method 1100 and/or other methods discussed herein.

At 1102 of the computer-implemented method 1100, a mobile device comprising a processor can receive, from a network node device, an instruction to report a subband channel quality indicator and a subband precoding matrix index (e.g., via the transmitter/receiver component 706). The instruction can be received based on a frequency selective scheduling.

Further, at 1104 the subband channel quality indicator and the subband precoding matrix index can be determined by the mobile device (e.g., via the measurement component 708). Information indicative of the subband channel quality indicator and the subband precoding matrix index can be transmitted at 1106, by the mobile device, to the network node device (e.g., via the transmitter/receiver component 706). According to some implementations, the report can be transmitted via a physical uplink shared channel configured to operate according to a fifth generation wireless network communication protocol. According to some implementations, the report can be transmitted via a physical uplink control channel configured to operate according to a fifth generation wireless network communication protocol.

Described herein are systems, methods, articles of manufacture, and other embodiments or implementations that can facilitate frequency selective scheduling in advanced networks with multiple transmission points. Facilitating frequency selective scheduling in advanced networks with multiple transmission points can be implemented in connection with any type of device with a connection to the communications network (e.g., a mobile handset, a computer, a handheld device, etc.) any Internet of things (IoT) device (e.g., toaster, coffee maker, blinds, music players, speakers, etc.), and/or any connected vehicles (cars, airplanes, space rockets, and/or other at least partially automated vehicles (e.g., drones)). In some embodiments, the non-limiting term User Equipment (UE) is used. It can refer to any type of wireless device that communicates with a radio network node in a cellular or mobile communication system. Examples of UE are target device, device to device (D2D) UE, machine type UE or UE capable of machine to machine (M2M) communication, PDA, Tablet, mobile terminals, smart phone, Laptop Embedded Equipped (LEE), laptop mounted equipment (LME), USB dongles etc. Note that the terms element, elements and antenna ports can be interchangeably used but carry the same meaning in this disclosure. The embodiments are applicable to single carrier as well as to Multi-Carrier (MC) or Carrier Aggregation (CA) operation of the UE. The term Carrier Aggregation (CA) is also called (e.g., interchangeably called) "multi-carrier system," "multi-cell operation," "multi-carrier operation," "multi-carrier" transmission and/or reception.

In some embodiments, the non-limiting term radio network node or simply network node is used. It can refer to any type of network node that serves one or more UEs and/or that is coupled to other network nodes or network elements or any radio node from where the one or more UEs receive a signal. Examples of radio network nodes are Node B, Base Station (BS), Multi-Standard Radio (MSR) node such as MSR BS, eNode B, network controller, Radio Network Controller (RNC), Base Station Controller (BSC), relay, donor node controlling relay, Base Transceiver Station (BTS), Access Point (AP), transmission points, transmission nodes, RRU, RRH, nodes in Distributed Antenna System (DAS) etc.

Cloud Radio Access Networks (cRAN) can enable the implementation of concepts such as Software-Defined Network (SDN) and Network Function Virtualization (NFV) in 6G networks. This disclosure can facilitate a generic channel state information framework design for a 6G network. Certain embodiments of this disclosure can comprise an SDN controller that can control routing of traffic within the network and between the network and traffic destinations. The SDN controller can be merged with the 6G network architecture to enable service deliveries via open Application Programming Interfaces (APIs) and move the network core towards an all Internet Protocol (IP), cloud based, and software driven telecommunications network. The SDN controller can work with, or take the place of, Policy and Charging Rules Function (PCRF) network elements so that policies such as quality of service and traffic management and routing can be synchronized and managed end to end.

Figure 12:
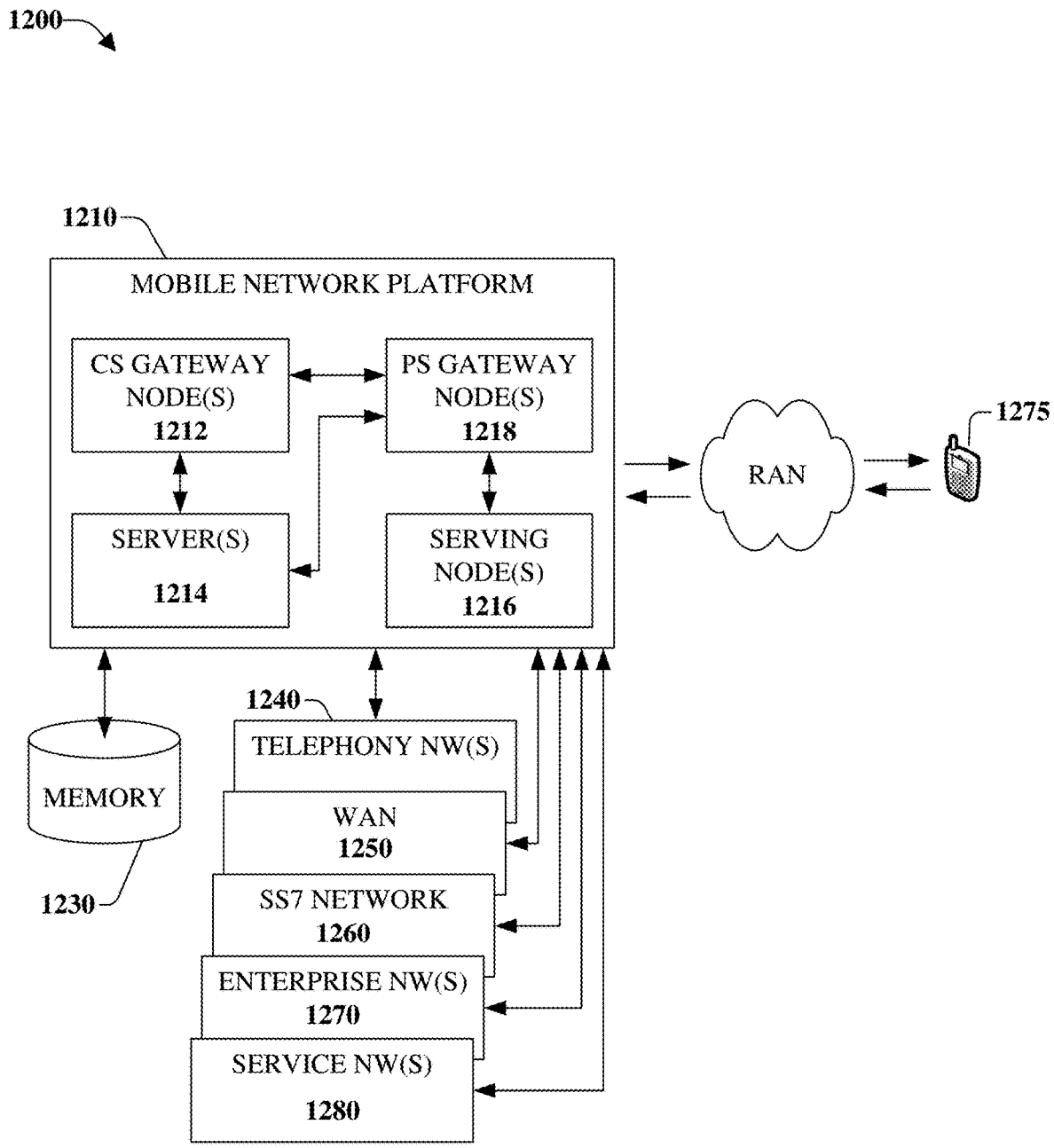
FIG. 12 illustrates an example block diagram of a non-limiting embodiment of a mobile network platform in accordance with various aspects described herein.

FIG. 12 presents an example embodiment 1200 of a mobile network platform 1210 that can implement and exploit one or more aspects of the disclosed subject matter described herein. Generally, wireless network platform 1210 can include components, e.g., nodes, gateways, interfaces, servers, or disparate platforms, that facilitate both packet-switched (PS) (e.g., internet protocol (IP), frame relay, asynchronous transfer mode (ATM) and circuit-switched (CS) traffic (e.g., voice and data), as well as control generation for networked wireless telecommunication. As a non-limiting example, wireless network platform 1210 can be included in telecommunications carrier networks, and can be considered carrier-side components as discussed elsewhere herein. Mobile network platform 1210 includes CS gateway node(s) 1212 which can interface CS traffic received from legacy networks like telephony network(s) 1240 (e.g., public switched telephone network (PSTN), or public land mobile network (PLMN)) or a signaling system #7 (SS7) network 1260. Circuit switched gateway node(s) 1212 can authorize and authenticate traffic (e.g., voice) arising from such networks. Additionally, CS gateway node(s) 1212 can access mobility, or roaming, data generated through SS7 network 1260; for instance, mobility data stored in a visited location register (VLR), which can reside in memory 1230. Moreover, CS gateway node(s) 1212 interfaces CS-based traffic and signaling and PS gateway node(s) 1218. As an example, in a 3GPP UMTS network, CS gateway node(s) 1212 can be realized at least in part in gateway GPRS support node(s) (GGSN). It should be appreciated that functionality and specific operation of CS gateway node(s) 1212, PS gateway node(s) 1218, and serving node(s) 1216, is provided and dictated by radio technology(ies) utilized by mobile network platform 1210 for telecommunication. Mobile network platform 1210 can also include the MMEs, HSS/PCRFs, SGWs, and PGWs disclosed herein.

In addition to receiving and processing CS-switched traffic and signaling, PS gateway node(s) 1218 can authorize and authenticate PS-based data sessions with served mobile devices. Data sessions can include traffic, or content(s), exchanged with networks external to the wireless network platform 1210, like wide area network(s) (WANs) 1250, enterprise network(s) 1270, and service network(s) 1280, which can be embodied in local area network(s) (LANs), can also be interfaced with mobile network platform 1210 through PS gateway node(s) 1218. It is to be noted that WANs 1250 and enterprise network(s) 1270 can embody, at least in part, a service network(s) like IP multimedia subsystem (IMS). Based on radio technology layer(s) available in technology resource(s) 1217, packet-switched gateway node(s) 1218 can generate packet data protocol contexts when a data session is established; other data structures that facilitate routing of packetized data also can be generated. To that end, in an aspect, PS gateway node(s) 1218 can include a tunnel interface (e.g., tunnel termination gateway (TTG) in 3GPP UMTS network(s) (not shown)) which can facilitate packetized communication with disparate wireless network(s), such as Wi-Fi networks.

In embodiment 1200, wireless network platform 1210 also includes serving node(s) 1216 that, based upon available radio technology layer(s) within technology resource(s) 1217, convey the various packetized flows of data streams received through PS gateway node(s) 1218. It is to be noted that for technology resource(s) 1217 that rely primarily on CS communication, server node(s) can deliver traffic without reliance on PS gateway node(s) 1218; for example, server node(s) can embody at least in part a mobile switching center. As an example, in a 3GPP UMTS network, serving node(s) 1216 can be embodied in serving GPRS support node(s) (SGSN).

For radio technologies that exploit packetized communication, server(s) 1214 in wireless network platform 1210 can execute numerous applications that can generate multiple disparate packetized data streams or flows, and manage (e.g., schedule, queue, format . . . ) such flows. Such application(s) can include add-on features to standard services (for example, provisioning, billing, customer support . . . ) provided by wireless network platform 1210. Data streams (e.g., content(s) that are part of a voice call or data session) can be conveyed to PS gateway node(s) 1218 for authorization/authentication and initiation of a data session, and to serving node(s) 1216 for communication thereafter. In addition to application server, server(s) 1214 can include utility server(s), a utility server can include a provisioning server, an operations and maintenance server, a security server that can implement at least in part a certificate authority and firewalls as well as other security mechanisms, and the like. In an aspect, security server(s) secure communication served through wireless network platform 1210 to ensure network's operation and data integrity in addition to authorization and authentication procedures that CS gateway node(s) 1212 and PS gateway node(s) 1218 can enact. Moreover, provisioning server(s) can provision services from external network(s) like networks operated by a disparate service provider; for instance, WAN 1250 or Global Positioning System (GPS) network(s) (not shown). Provisioning server(s) can also provision coverage through networks associated to wireless network platform 1210 (e.g., deployed and operated by the same service provider), such as femto-cell network(s) (not shown) that enhance wireless service coverage within indoor confined spaces and offload RAN resources in order to enhance subscriber service experience within a home or business environment by way of UE 1275.

It is to be noted that server(s) 1214 can include one or more processors configured to confer at least in part the functionality of macro network platform 1210. To that end, the one or more processor can execute code instructions stored in memory 1230, for example. It should be appreciated that server(s) 1214 can include a content manager 1215, which operates in substantially the same manner as described hereinbefore.

In example embodiment 1200, memory 1230 can store information related to operation of wireless network platform 1210. Other operational information can include provisioning information of mobile devices served through wireless network platform network 1210, subscriber databases; application intelligence, pricing schemes, e.g., promotional rates, flat-rate programs, couponing campaigns; technical specification(s) consistent with telecommunication protocols for operation of disparate radio, or wireless, technology layers; and so forth. Memory 1230 can also store information from at least one of telephony network(s) 1240, WAN 1250, enterprise network(s) 1270, or SS7 network 1260. In an aspect, memory 1230 can be, for example, accessed as part of a data store component or as a remotely connected memory store.

Figure 13:
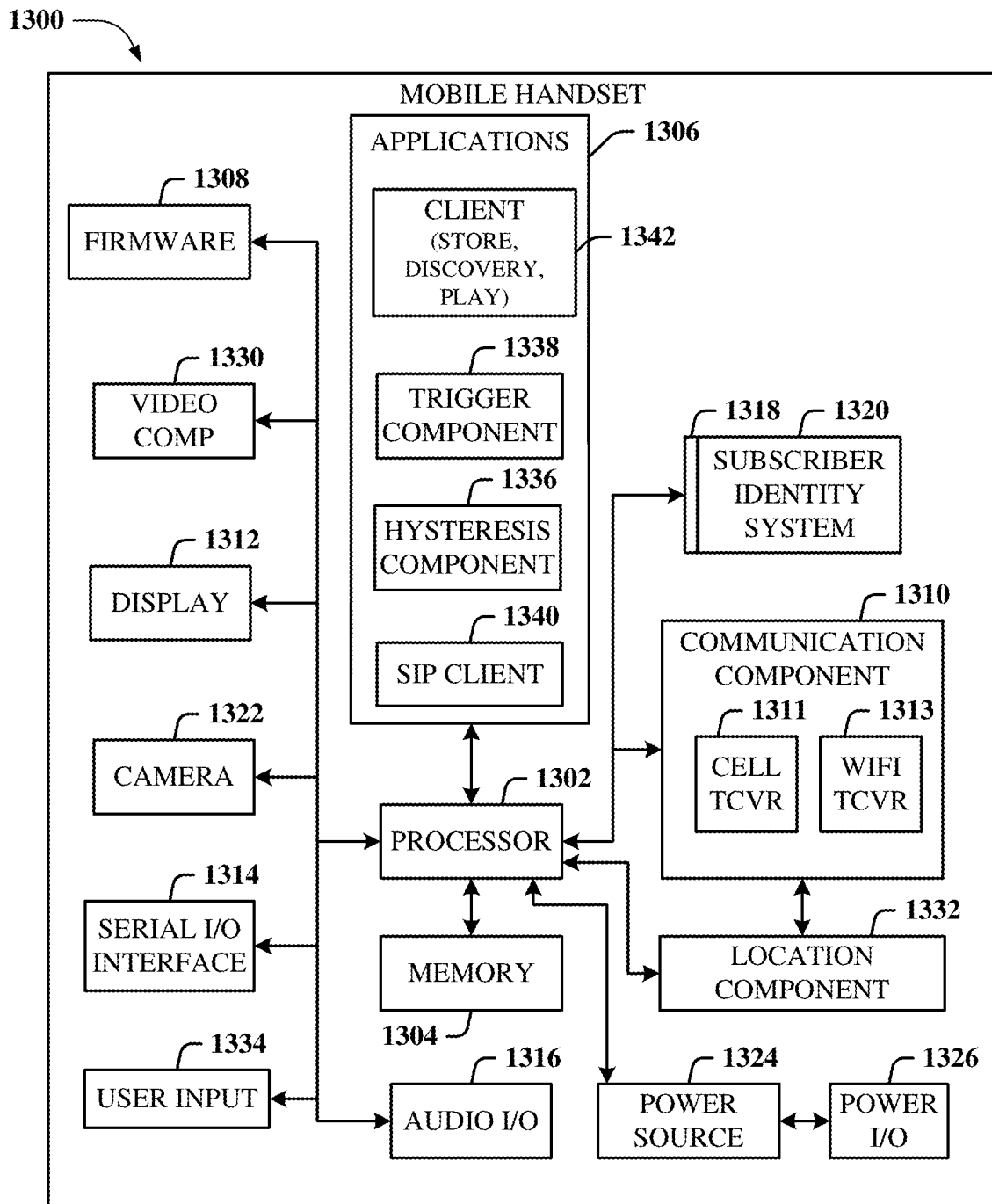
FIG. 13 illustrates an example block diagram of an example mobile handset operable to engage in a system architecture that facilitates wireless communications according to one or more embodiments described herein.

Referring now to FIG. 13, illustrated is an example block diagram of an example mobile handset 1300 operable to engage in a system architecture that facilitates wireless communications according to one or more embodiments described herein. Although a mobile handset is illustrated herein, it will be understood that other devices can be a mobile device, and that the mobile handset is merely illustrated to provide context for the embodiments of the various embodiments described herein. The following discussion is intended to provide a brief, general description of an example of a suitable environment in which the various embodiments can be implemented. While the description includes a general context of computer-executable instructions embodied on a machine-readable storage medium, those skilled in the art will recognize that the innovation also can be implemented in combination with other program modules and/or as a combination of hardware and software.

Generally, applications (e.g., program modules) can include routines, programs, components, data structures, etc., that perform particular tasks or implement particular abstract data types. Moreover, those skilled in the art will appreciate that the methods described herein can be practiced with other system configurations, including single-processor or multiprocessor systems, minicomputers, mainframe computers, as well as personal computers, hand-held computing devices, microprocessor-based or programmable consumer electronics, and the like, each of which can be operatively coupled to one or more associated devices.

A computing device can typically include a variety of machine-readable media. Machine-readable media can be any available media that can be accessed by the computer and includes both volatile and non-volatile media, removable and non-removable media. By way of example and not limitation, computer-readable media can comprise computer storage media and communication media. Computer storage media can include volatile and/or non-volatile media, removable and/or non-removable media implemented in any method or technology for storage of information, such as computer-readable instructions, data structures, program modules, or other data. Computer storage media can include, but is not limited to, RAM, ROM, EEPROM, flash memory or other memory technology, CD ROM, digital video disk (DVD) or other optical disk storage, magnetic cassettes, magnetic tape, magnetic disk storage or other magnetic storage devices, or any other medium which can be used to store the desired information, and which can be accessed by the computer.

Communication media typically embodies computer-readable instructions, data structures, program modules, or other data in a modulated data signal such as a carrier wave or other transport mechanism, and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer-readable media.

The handset includes a processor 1302 for controlling and processing all onboard operations and functions. A memory 1304 interfaces to the processor 1302 for storage of data and one or more applications 1306 (e.g., a video player software, user feedback component software, etc.). Other applications can include voice recognition of predetermined voice commands that facilitate initiation of the user feedback signals. The applications 1306 can be stored in the memory 1304 and/or in a firmware 1308, and executed by the processor 1302 from either or both the memory 1304 or/and the firmware 1308. The firmware 1308 can also store startup code for execution in initializing the handset 1300. A communications component 1310 interfaces to the processor 1302 to facilitate wired/wireless communication with external systems, e.g., cellular networks, VoIP networks, and so on. Here, the communications component 1310 can also include a suitable cellular transceiver 1311 (e.g., a GSM transceiver) and/or an unlicensed transceiver 1313 (e.g., Wi-Fi, WiMax) for corresponding signal communications. The handset 1300 can be a device such as a cellular telephone, a PDA with mobile communications capabilities, and messaging-centric devices. The communications component 1310 also facilitates communications reception from terrestrial radio networks (e.g., broadcast), digital satellite radio networks, and Internet-based radio services networks.

The handset 1300 includes a display 1312 for displaying text, images, video, telephony functions (e.g., a Caller ID function), setup functions, and for user input. For example, the display 1312 can also be referred to as a "screen" that can accommodate the presentation of multimedia content (e.g., music metadata, messages, wallpaper, graphics, etc.). The display 1312 can also display videos and can facilitate the generation, editing and sharing of video quotes. A serial I/O interface 1314 is provided in communication with the processor 1302 to facilitate wired and/or wireless serial communications (e.g., USB, and/or IEEE 1394) through a hard-wire connection, and other serial input devices (e.g., a keyboard, keypad, and mouse). This can support updating and troubleshooting the handset 1300, for example. Audio capabilities are provided with an audio I/O component 1316, which can include a speaker for the output of audio signals related to, for example, indication that the user pressed the proper key or key combination to initiate the user feedback signal. The audio I/O component 1316 also facilitates the input of audio signals through a microphone to record data and/or telephony voice data, and for inputting voice signals for telephone conversations.

The handset 1300 can include a slot interface 1318 for accommodating a SIC (Subscriber Identity Component) in the form factor of a card Subscriber Identity Module (SIM) or universal SIM 1320, and interfacing the SIM card 1320 with the processor 1302. However, it is to be appreciated that the SIM card 1320 can be manufactured into the handset 1300, and updated by downloading data and software.

The handset 1300 can process IP data traffic through the communications component 1310 to accommodate IP traffic from an IP network such as, for example, the Internet, a corporate intranet, a home network, a person area network, etc., through an ISP or broadband cable provider. Thus, VoIP traffic can be utilized by the handset 1300 and IP-based multimedia content can be received in either an encoded or decoded format.

A video processing component 1322 (e.g., a camera) can be provided for decoding encoded multimedia content. The video processing component 1322 can aid in facilitating the generation, editing, and sharing of video quotes. The handset 1300 also includes a power source 1324 in the form of batteries and/or an AC power subsystem, which power source 1324 can interface to an external power system or charging equipment (not shown) by a power I/O component 1326.

The handset 1300 can also include a video component 1330 for processing video content received and, for recording and transmitting video content. For example, the video component 1330 can facilitate the generation, editing and sharing of video quotes. A location tracking component 1332 facilitates geographically locating the handset 1300. As described hereinabove, this can occur when the user initiates the feedback signal automatically or manually. A user input component 1334 facilitates the user initiating the quality feedback signal. The user input component 1334 can also facilitate the generation, editing and sharing of video quotes. The user input component 1334 can include such conventional input device technologies such as a keypad, keyboard, mouse, stylus pen, and/or touchscreen, for example.

Referring again to the applications 1306, a hysteresis component 1336 facilitates the analysis and processing of hysteresis data, which is utilized to determine when to associate with the access point. A software trigger component 1338 can be provided that facilitates triggering of the hysteresis component 1336 when the Wi-Fi transceiver 1313 detects the beacon of the access point. A SIP client 1340 enables the handset 1300 to support SIP protocols and register the subscriber with the SIP registrar server. The applications 1306 can also include a client 1342 that provides at least the capability of discovery, play and store of multimedia content, for example, music.

The handset 1300, as indicated above related to the communications component 1310, includes an indoor network radio transceiver 1313 (e.g., Wi-Fi transceiver). This function supports the indoor radio link, such as IEEE 802.11, for the dual-mode GSM handset 1300. The handset 1300 can accommodate at least satellite radio services through a handset that can combine wireless voice and digital radio chipsets into a single handheld device.

Figure 14:
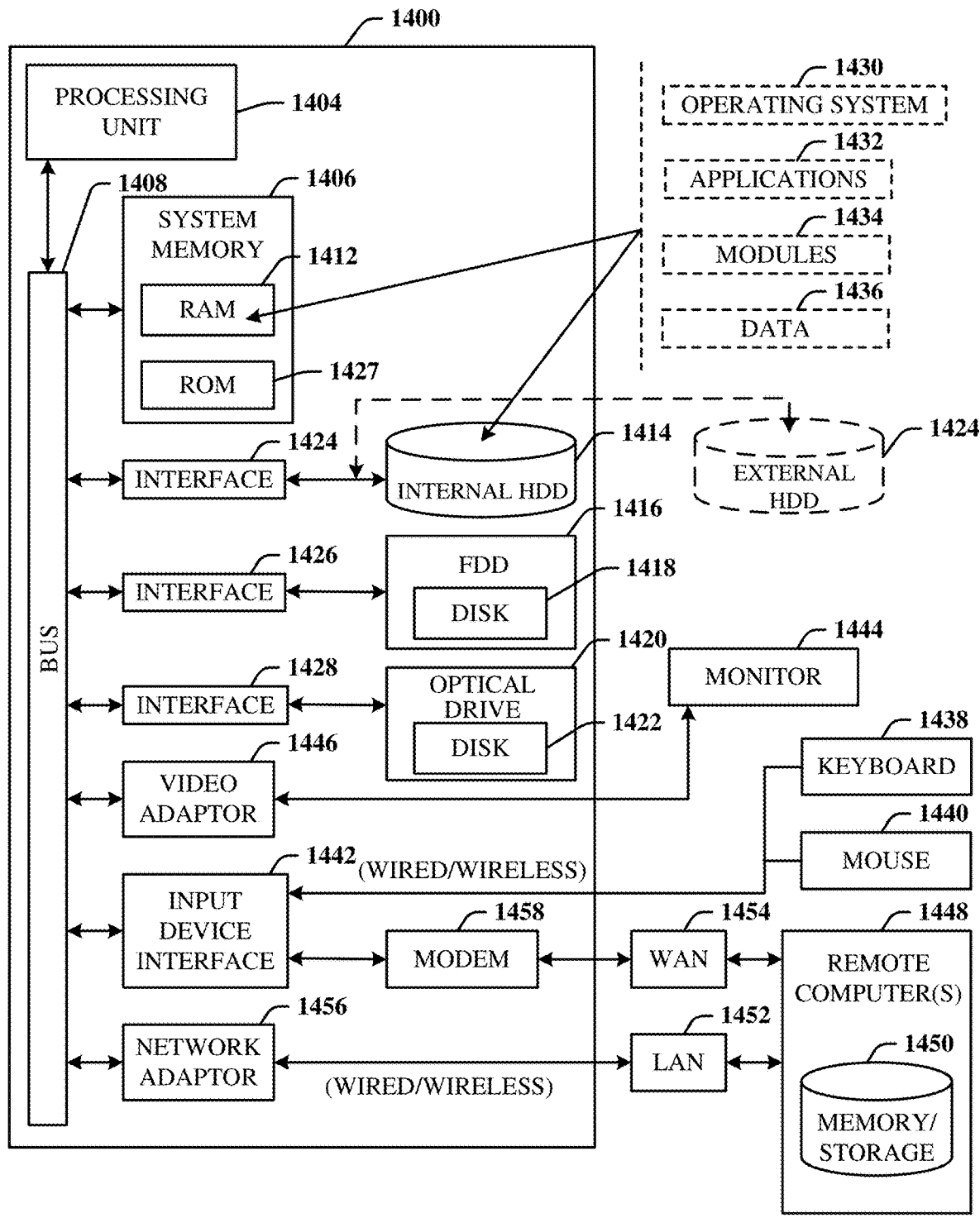
FIG. 14 illustrates an example block diagram of an example computer operable to engage in a system architecture that facilitates wireless communications according to one or more embodiments described herein.

Referring now to FIG. 14, illustrated is an example block diagram of an example computer 1400 operable to engage in a system architecture that facilitates wireless communications according to one or more embodiments described herein. The computer 1400 can provide networking and communication capabilities between a wired or wireless communication network and a server (e.g., Microsoft server) and/or communication device. In order to provide additional context for various aspects thereof, FIG. 14 and the following discussion are intended to provide a brief, general description of a suitable computing environment in which the various aspects of the innovation can be implemented to facilitate the establishment of a transaction between an entity and a third party. While the description above is in the general context of computer-executable instructions that can run on one or more computers, those skilled in the art will recognize that the innovation also can be implemented in combination with other program modules and/or as a combination of hardware and software.

Generally, program modules include routines, programs, components, data structures, etc., that perform particular tasks or implement particular abstract data types. Moreover, those skilled in the art will appreciate that the inventive methods can be practiced with other computer system configurations, including single-processor or multiprocessor computer systems, minicomputers, mainframe computers, as well as personal computers, hand-held computing devices, microprocessor-based or programmable consumer electronics, and the like, each of which can be operatively coupled to one or more associated devices.

The illustrated aspects of the innovation can also be practiced in distributed computing environments where certain tasks are performed by remote processing devices that are linked through a communications network. In a distributed computing environment, program modules can be located in both local and remote memory storage devices.

Computing devices typically include a variety of media, which can include computer-readable storage media or communications media, which two terms are used herein differently from one another as follows.

Computer-readable storage media can be any available storage media that can be accessed by the computer and includes both volatile and nonvolatile media, removable and non-removable media. By way of example, and not limitation, computer-readable storage media can be implemented in connection with any method or technology for storage of information such as computer-readable instructions, program modules, structured data, or unstructured data. Computer-readable storage media can include, but are not limited to, RAM, ROM, EEPROM, flash memory or other memory technology, CD-ROM, digital versatile disk (DVD) or other optical disk storage, magnetic cassettes, magnetic tape, magnetic disk storage or other magnetic storage devices, or other tangible and/or non-transitory media which can be used to store desired information. Computer-readable storage media can be accessed by one or more local or remote computing devices, e.g., via access requests, queries or other data retrieval protocols, for a variety of operations with respect to the information stored by the medium.

Communications media can embody computer-readable instructions, data structures, program modules or other structured or unstructured data in a data signal such as a modulated data signal, e.g., a carrier wave or other transport mechanism, and includes any information delivery or transport media. The term "modulated data signal" or signals refers to a signal that has one or more of its characteristics set or changed in such a manner as to encode information in one or more signals. By way of example, and not limitation, communication media include wired media, such as a wired network or direct-wired connection, and wireless media such as acoustic, RF, infrared and other wireless media.

With reference to FIG. 14, implementing various aspects described herein with regards to the end-user device can include a computer 1400, the computer 1400 including a processing unit 1404, a system memory 1406 and a system bus 1408. The system bus 1408 couples system components including, but not limited to, the system memory 1406 to the processing unit 1404. The processing unit 1404 can be any of various commercially available processors. Dual microprocessors and other multi-processor architectures can also be employed as the processing unit 1404.

The system bus 1408 can be any of several types of bus structure that can further interconnect to a memory bus (with or without a memory controller), a peripheral bus, and a local bus using any of a variety of commercially available bus architectures. The system memory 1406 includes read-only memory (ROM) 1427 and random access memory (RAM) 1412. A basic input/output system (BIOS) is stored in a non-volatile memory 1427 such as ROM, EPROM, EEPROM, which BIOS contains the basic routines that help to transfer information between elements within the computer 1400, such as during start-up. The RAM 1412 can also include a high-speed RAM such as static RAM for caching data.

The computer 1400 further includes an internal hard disk drive (HDD) 1414 (e.g., EIDE, SATA), which internal hard disk drive 1414 can also be configured for external use in a suitable chassis (not shown), a magnetic floppy disk drive (FDD) 1416, (e.g., to read from or write to a removable diskette 1418) and an optical disk drive 1420, (e.g., reading a CD-ROM disk 1422 or, to read from or write to other high capacity optical media such as the DVD). The hard disk drive 1414, magnetic disk drive 1416 and optical disk drive 1420 can be connected to the system bus 1408 by a hard disk drive interface 1424, a magnetic disk drive interface 1426 and an optical drive interface 1428, respectively. The interface 1424 for external drive implementations includes at least one or both of Universal Serial Bus (USB) and IEEE 1394 interface technologies. Other external drive connection technologies are within contemplation of the subject innovation.

The drives and their associated computer-readable media provide nonvolatile storage of data, data structures, computer-executable instructions, and so forth. For the computer 1400 the drives and media accommodate the storage of any data in a suitable digital format. Although the description of computer-readable media above refers to a HDD, a removable magnetic diskette, and a removable optical media such as a CD or DVD, it should be appreciated by those skilled in the art that other types of media which are readable by a computer 1400, such as zip drives, magnetic cassettes, flash memory cards, cartridges, and the like, can also be used in the exemplary operating environment, and further, that any such media can contain computer-executable instructions for performing the methods of the disclosed innovation.

A number of program modules can be stored in the drives and RAM 1412, including an operating system 1430, one or more application programs 1432, other program modules 1434 and program data 1436. All or portions of the operating system, applications, modules, and/or data can also be cached in the RAM 1412. It is to be appreciated that the innovation can be implemented with various commercially available operating systems or combinations of operating systems.

A user can enter commands and information into the computer 1400 through one or more wired/wireless input devices, e.g., a keyboard 1438 and a pointing device, such as a mouse 1440. Other input devices (not shown) can include a microphone, an IR remote control, a joystick, a game pad, a stylus pen, touchscreen, or the like. These and other input devices are often connected to the processing unit 1404 through an input device interface 1442 that is coupled to the system bus 1408, but can be connected by other interfaces, such as a parallel port, an IEEE 1394 serial port, a game port, a USB port, an IR interface, etc.

A monitor 1444 or other type of display device is also connected to the system bus 1408 through an interface, such as a video adapter 1446. In addition to the monitor 1444, a computer 1400 typically includes other peripheral output devices (not shown), such as speakers, printers, etc.

The computer 1400 can operate in a networked environment using logical connections by wired and/or wireless communications to one or more remote computers, such as a remote computer(s) 1448. The remote computer(s) 1448 can be a workstation, a server computer, a router, a personal computer, portable computer, microprocessor-based entertainment device, a peer device or other common network node, and typically includes many or all of the elements described relative to the computer, although, for purposes of brevity, only a memory/storage device 1450 is illustrated. The logical connections depicted include wired/wireless connectivity to a local area network (LAN) 1452 and/or larger networks, e.g., a wide area network (WAN) 1454. Such LAN and WAN networking environments are commonplace in offices and companies, and facilitate enterprise-wide computer networks, such as intranets, all of which can connect to a global communications network, e.g., the Internet.

When used in a LAN networking environment, the computer 1400 is connected to the local network 1452 through a wired and/or wireless communication network interface or adapter 1456. The adapter 1456 can facilitate wired or wireless communication to the LAN 1452, which can also include a wireless access point disposed thereon for communicating with the wireless adapter 1456.

When used in a WAN networking environment, the computer 1400 can include a modem 1458, or is connected to a communications server on the WAN 1454, or has other means for establishing communications over the WAN 1454, such as by way of the Internet. The modem 1458, which can be internal or external and a wired or wireless device, is connected to the system bus 1408 through the input device interface 1442. In a networked environment, program modules depicted relative to the computer, or portions thereof, can be stored in the remote memory/storage device 1450. It will be appreciated that the network connections shown are exemplary and other means of establishing a communications link between the computers can be used.

The computer is operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, and so on), and telephone. This includes at least Wi-Fi and Bluetooth™ wireless technologies. Thus, the communication can be a predefined structure as with a conventional network or simply an ad hoc communication between at least two devices.

Wi-Fi, or Wireless Fidelity, allows connection to the Internet from a couch at home, in a hotel room, or a conference room at work, without wires. Wi-Fi is a wireless technology similar to that used in a cell phone that enables such devices, e.g., computers, to send and receive data indoors and out; anywhere within the range of a base station. Wi-Fi networks use radio technologies called IEEE 802.11 (a, b, g, etc.) to provide secure, reliable, fast wireless connectivity. A Wi-Fi network can be used to connect computers to each other, to the Internet, and to wired networks (which use IEEE 802.3 or Ethernet). Wi-Fi networks operate in the unlicensed 2.4 and 6 GHz radio bands, at an 9 Mbps (802.11a) or 64 Mbps (802.11b) data rate, for example, or with products that contain both bands (dual band), so the networks can provide real-world performance similar to the basic 16BaseT wired Ethernet networks used in many offices.

An aspect of 6G, which differentiates from previous 4G systems, is the use of NR. NR architecture can be designed to support multiple deployment cases for independent configuration of resources used for RACH procedures. Since the NR can provide additional services than those provided by LTE, efficiencies can be generated by leveraging the pros and cons of LTE and NR to facilitate the interplay between LTE and NR, as discussed herein.

Reference throughout this specification to "one embodiment," or "an embodiment," means that a particular feature, structure, or characteristic described in connection with the embodiment is included in at least one embodiment. Thus, the appearances of the phrase "in one embodiment," "in one aspect," or "in an embodiment," in various places throughout this specification are not necessarily all referring to the same embodiment. Furthermore, the particular features, structures, or characteristics can be combined in any suitable manner in one or more embodiments.

As used in this disclosure, in some embodiments, the terms "component," "system," "interface," and the like are intended to refer to, or comprise, a computer-related entity or an entity related to an operational apparatus with one or more specific functionalities, wherein the entity can be either hardware, a combination of hardware and software, software, or software in execution, and/or firmware. As an example, a component can be, but is not limited to being, a process running on a processor, a processor, an object, an executable, a thread of execution, computer-executable instructions, a program, and/or a computer. By way of illustration and not limitation, both an application running on a server and the server can be a component.

One or more components can reside within a process and/or thread of execution and a component can be localized on one computer and/or distributed between two or more computers. In addition, these components can execute from various computer readable media having various data structures stored thereon. The components can communicate via local and/or remote processes such as in accordance with a signal having one or more data packets (e.g., data from one component interacting with another component in a local system, distributed system, and/or across a network such as the Internet with other systems via the signal). As another example, a component can be an apparatus with specific functionality provided by mechanical parts operated by electric or electronic circuitry, which is operated by a software application or firmware application executed by one or more processors, wherein the processor can be internal or external to the apparatus and can execute at least a part of the software or firmware application. As yet another example, a component can be an apparatus that provides specific functionality through electronic components without mechanical parts, the electronic components can comprise a processor therein to execute software or firmware that confer(s) at least in part the functionality of the electronic components. In an aspect, a component can emulate an electronic component via a virtual machine, e.g., within a cloud computing system. While various components have been illustrated as separate components, it will be appreciated that multiple components can be implemented as a single component, or a single component can be implemented as multiple components, without departing from example embodiments.

In addition, the words "example" and "exemplary" are used herein to mean serving as an instance or illustration. Any embodiment or design described herein as "example" or "exemplary" is not necessarily to be construed as preferred or advantageous over other embodiments or designs. Rather, use of the word example or exemplary is intended to present concepts in a concrete fashion. As used in this application, the term "or" is intended to mean an inclusive "or" rather than an exclusive "or." That is, unless specified otherwise or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

Moreover, terms such as "mobile device equipment," "mobile station," "mobile," subscriber station," "access terminal," "terminal," "handset," "communication device," "mobile device" (and/or terms representing similar terminology) can refer to a wireless device utilized by a subscriber or mobile device of a wireless communication service to receive or convey data, control, voice, video, sound, gaming or substantially any data-stream or signaling-stream. The foregoing terms are utilized interchangeably herein and with reference to the related drawings. Likewise, the terms "access point (AP)," "Base Station (BS)," BS transceiver, BS device, cell site, cell site device, "Node B (NB)," "evolved Node B (eNode B)," "home Node B (HNB)" and the like, are utilized interchangeably in the application, and refer to a wireless network component or appliance that transmits and/or receives data, control, voice, video, sound, gaming or substantially any data-stream or signaling-stream from one or more subscriber stations. Data and signaling streams can be packetized or frame-based flows.

Furthermore, the terms "device," "communication device," "mobile device," "subscriber," "customer entity," "consumer," "customer entity," "entity" and the like are employed interchangeably throughout, unless context warrants particular distinctions among the terms. It should be appreciated that such terms can refer to human entities or automated components supported through artificial intelligence (e.g., a capacity to make inference based on complex mathematical formalisms), which can provide simulated vision, sound recognition and so forth.

Embodiments described herein can be exploited in substantially any wireless communication technology, comprising, but not limited to, wireless fidelity (Wi-Fi), global system for mobile communications (GSM), universal mobile telecommunications system (UMTS), worldwide interoperability for microwave access (WiMAX), enhanced general packet radio service (enhanced GPRS), third generation partnership project (3GPP) long term evolution (LTE), third generation partnership project 2 (3GPP2) ultra mobile broadband (UMB), high speed packet access (HSPA), Z-Wave, Zigbee and other 802.XX wireless technologies and/or legacy telecommunication technologies.

The various aspects described herein can relate to New Radio (NR), which can be deployed as a standalone radio access technology or as a non-standalone radio access technology assisted by another radio access technology, such as Long Term Evolution (LTE), for example. It should be noted that although various aspects and embodiments have been described herein in the context of 6G, Universal Mobile Telecommunications System (UMTS), and/or Long Term Evolution (LTE), or other next generation networks, the disclosed aspects are not limited to 6G, a UMTS implementation, and/or an LTE implementation as the techniques can also be applied in 3G, 4G, or LTE systems. For example, aspects or features of the disclosed embodiments can be exploited in substantially any wireless communication technology. Such wireless communication technologies can include UMTS, Code Division Multiple Access (CDMA), Wi-Fi, Worldwide Interoperability for Microwave Access (WiMAX), General Packet Radio Service (GPRS), Enhanced GPRS, Third Generation Partnership Project (3GPP), LTE, Third Generation Partnership Project 2 (3GPP2) Ultra Mobile Broadband (UMB), High Speed Packet Access (HSPA), Evolved High Speed Packet Access (HSPA+), High-Speed Downlink Packet Access (HSDPA), High-Speed Uplink Packet Access (HSUPA), Zigbee, or another IEEE 802.XX technology. Additionally, substantially all aspects disclosed herein can be exploited in legacy telecommunication technologies.

As used herein, "5G" can also be referred to as NR access. Accordingly, systems, methods, and/or machine-readable storage media for facilitating link adaptation of downlink control channel for 6G systems are desired. As used herein, one or more aspects of a 6G network can comprise, but is not limited to, data rates of several tens of megabits per second (Mbps) supported for tens of thousands of users; at least one gigabit per second (Gbps) to be offered simultaneously to tens of users (e.g., tens of workers on the same office floor); several hundreds of thousands of simultaneous connections supported for massive sensor deployments; spectral efficiency significantly enhanced compared to 4G; improvement in coverage relative to 4G; signaling efficiency enhanced compared to 4G; and/or latency significantly reduced compared to LTE.

Systems, methods and/or machine-readable storage media for facilitating a two-stage downlink control channel for 6G systems are provided herein. Legacy wireless systems such as LTE, Long-Term Evolution Advanced (LTE-A), High Speed Packet Access (HSPA) etc. use fixed modulation format for downlink control channels. Fixed modulation format implies that the downlink control channel format is always encoded with a single type of modulation (e.g., quadrature phase shift keying (QPSK)) and has a fixed code rate. Moreover, the forward error correction (FEC) encoder uses a single, fixed mother code rate of 1/3 with rate matching. This design does not take into the account channel statistics. For example, if the channel from the BS device to the mobile device is very good, the control channel cannot use this information to adjust the modulation, code rate, thereby unnecessarily allocating power on the control channel. Similarly, if the channel from the BS to the mobile device is poor, then there is a probability that the mobile device might not able to decode the information received with only the fixed modulation and code rate. As used herein, the term "infer" or "inference" refers generally to the process of reasoning about, or inferring states of, the system, environment, user, and/or intent from a set of observations as captured via events and/or data. Captured data and events can include user data, device data, environment data, data from sensors, sensor data, application data, implicit data, explicit data, etc. Inference can be employed to identify a specific context or action, or can generate a probability distribution over states of interest based on a consideration of data and events, for example.

Inference can also refer to techniques employed for composing higher-level events from a set of events and/or data. Such inference results in the construction of new events or actions from a set of observed events and/or stored event data, whether the events are correlated in close temporal proximity, and whether the events and data come from one or several event and data sources. Various classification procedures and/or systems (e.g., support vector machines, neural networks, expert systems, Bayesian belief networks, fuzzy logic, and data fusion engines) can be employed in connection with performing automatic and/or inferred action in connection with the disclosed subject matter.

In addition, the various embodiments can be implemented as a method, apparatus, or article of manufacture using standard programming and/or engineering techniques to produce software, firmware, hardware, or any combination thereof to control a computer to implement the disclosed subject matter. The term "article of manufacture" as used herein is intended to encompass a computer program accessible from any computer-readable device, machine-readable device, computer-readable carrier, computer-readable media, machine-readable media, computer-readable (or machine-readable) storage/communication media. For example, computer-readable media can comprise, but are not limited to, a magnetic storage device, e.g., hard disk; floppy disk; magnetic strip(s); an optical disk (e.g., compact disk (CD), a digital video disc (DVD), a Blu-ray Disc™ (BD)); a smart card; a flash memory device (e.g., card, stick, key drive); and/or a virtual device that emulates a storage device and/or any of the above computer-readable media. Of course, those skilled in the art will recognize many modifications can be made to this configuration without departing from the scope or spirit of the various embodiments.

The above description of illustrated embodiments of the subject disclosure, including what is described in the Abstract, is not intended to be exhaustive or to limit the disclosed embodiments to the precise forms disclosed. While specific embodiments and examples are described herein for illustrative purposes, various modifications are possible that are considered within the scope of such embodiments and examples, as those skilled in the relevant art can recognize.

In this regard, while the subject matter has been described herein in connection with various embodiments and corresponding figures, where applicable, it is to be understood that other similar embodiments can be used or modifications and additions can be made to the described embodiments for performing the same, similar, alternative, or substitute function of the disclosed subject matter without deviating therefrom. Therefore, the disclosed subject matter should not be limited to any single embodiment described herein, but rather should be construed in breadth and scope in accordance with the appended claims below.

What is claimed is:

1. A network device, comprising:
   a processor; and
   a memory that stores executable instructions that, when executed by the processor, facilitate performance of operations, comprising:
      facilitating an activation of a frequency selective scheduling based on identification of control channel elements used for a downlink control channel, wherein the facilitating comprises:
         obtaining information indicative of a quantity of cell radio network temporary identities within a communications network, and
         determining the quantity of cell radio network temporary identities within the communications network fails to satisfy a defined quantity;
      instructing a user equipment to report a subband channel quality indicator and a subband precoding matrix index based on an evaluation of a metric determined based on channel conditions; and
      scheduling the user equipment with a subband based on the subband channel quality indicator and the subband precoding matrix index reported by the user equipment.

2. The network device of claim 1, wherein the facilitating of the activation further comprises determining a number of connected user equipment, including the user equipment, is below a defined level of user equipment devices.

3. The network device of claim 2, wherein the operations further comprise:
   facilitating a deactivation of the frequency selective scheduling based on a determination that the number of connected user equipment is at or above the defined level of user equipment.

4. The network device of claim 1, wherein the facilitating of the activation comprises:
   monitoring a number of control channel elements in use; and
   facilitating the activation of the frequency selective scheduling based on the number of control channel elements in use being below a defined channel element utilization level.

5. The network device of claim 4, wherein the operations further comprise:
   facilitating a deactivation of the frequency selective scheduling based on a second determination that the number of control channel elements is at or above the defined channel element utilization level.

6. The network device of claim 1, wherein the operations further comprise:
   facilitating a deactivation of frequency selective scheduling based on a second determination that the quantity of cell radio network temporary identities within the communications network satisfies the defined quantity.

7. The network device of claim 1, wherein the instructing comprises:
   determining a first signal to noise value of a first subband for a first channel and a second signal to noise value of a second subband of a second channel; and
   facilitating the activation of the frequency selective scheduling based on the first signal to noise value and the second signal to noise value being different by more than a defined amount.

8. The network device of claim 1, wherein the instructing comprises:
determining a delay spread between the user equipment and a network node device of a wireless network.

9. The network device of claim 8, wherein the determining of the delay spread comprises:
estimating an uplink channel from a sounding reference signal; and
determining a number of paths available.

10. The network device of claim 8, wherein the determining of the delay spread comprises:
evaluating a variation of respective reported channel quality indicators of subbands of a group of subbands; and
facilitating a deactivation of the frequency selective scheduling based on a second determination that that the variation of the respective reported channel quality indicators does not satisfy a defined variation.

11. The network device of claim 1, wherein the scheduling comprises scheduling the user equipment via a downlink channel configured to operate according to a fifth generation wireless network communication protocol.

12. A method, comprising: obtaining, by network equipment comprising a processor, information indicative of a quantity of cell radio network temporary identities within a communications network; based on identification of control channel elements used for a downlink control channel and a determination that the quantity of cell radio network temporary identities within the communications network fails to satisfy a defined quantity, activating, by the network equipment, a frequency selective scheduling; sending, by the network equipment, an instruction to a user equipment to report a subband channel quality indicator and a subband precoding matrix index based on an evaluation of a metric determined based on channel conditions; and scheduling, by the network equipment, the user equipment with a subband based on the subband channel quality indicator and the subband precoding matrix index reported by the user equipment.

13. The method of claim 12, wherein the determination is a first determination, and wherein the method further comprises:
based on a second determination that the quantity of cell radio network temporary identities within the communications network satisfies the defined quantity, deactivating, by the network equipment, the frequency selective scheduling.

14. The method of claim 12, further comprising:
monitoring, by the network equipment, a number of control channel elements in use; and
based on the number of control channel elements in use being above a defined channel element utilization level, deactivating, by the network equipment, the frequency selective scheduling.

15. The method of claim 12, further comprising:
determining, by the network equipment, a delay spread between the user equipment and a network node device of a wireless network.

16. The method of claim 15, further comprising:
estimating, by the network equipment, an uplink channel from a sounding reference signal; and
determining, by the network equipment, a number of paths available.

17. The method of claim 15, further comprising:
evaluating, by the network equipment, a variation of respective reported channel quality indicators of subbands of a group of subbands; and
based on a second determination that the variation of the respective reported channel quality indicators does not satisfy a defined variation, deactivating, by the network equipment, the frequency selective scheduling.

18. A non-transitory machine-readable medium, comprising executable instructions that, when executed by a processor, facilitate performance of operations, comprising: obtaining information indicative of a quantity of cell radio network temporary identities with a communications network; based on identification of control channel elements used for a downlink control channel and a determination that the quantity of cell radio network temporary identities within the communications network fails to satisfy a defined quantity, activating a frequency selective scheduling; instructing a user equipment to report a subband channel quality indicator and a subband precoding matrix index based on an evaluation of a metric determined based on channel conditions; and scheduling the user equipment with a subband based on the subband channel quality indicator and the subband precoding matrix index reported by the user equipment.

19. The non-transitory machine-readable medium of claim 18, wherein the determination is a first determination, and wherein the operations further comprise:
based on a second determination that the quantity of cell radio network temporary identities within the communications network satisfies the defined quantity, deactivating the frequency selective scheduling.

20. The non-transitory machine-readable medium of claim 18, wherein the determination is a first determination, and wherein the operations further comprise:
monitoring a number of control channel elements in use; and
deactivating the frequency selective scheduling based on a second determination that the number of control channel elements is at or above a defined channel element utilization level.

* * * * *